United States Patent [19]

Akada

[11] Patent Number: 5,489,959
[45] Date of Patent: Feb. 6, 1996

[54] LIGHT QUANTITY ADJUSTING DEVICE

[75] Inventor: Hiroshi Akada, Kanagawa, Japan

[73] Assignee: Canon Kabushiki Kaisha, Tokyo, Japan

[21] Appl. No.: 457,164

[22] Filed: Jun. 1, 1995

Related U.S. Application Data

[63] Continuation of Ser. No. 167,234, Dec. 14, 1993, abandoned.

[30] Foreign Application Priority Data

Dec. 18, 1992 [JP] Japan .................................. 4-354922
Dec. 7, 1993 [JP] Japan .................................. 5-306750

[51] Int. Cl.$^6$ .................................................. G03B 9/08
[52] U.S. Cl. ......................... 354/234.1; 354/271.1; 310/36; 385/18
[58] Field of Search ........................... 354/234.1, 235.1, 354/270, 271.1; 348/362, 363; 359/227, 230, 234; 310/36, 37, 38, 39; 385/18

[56] References Cited

U.S. PATENT DOCUMENTS 5,000,534  3/1991  Watanabe et al. ..................... 385/18

FOREIGN PATENT DOCUMENTS 3-29837  3/1991  Japan .

Primary Examiner—Howard B. Blankenship
Attorney, Agent, or Firm—Robin, Blecker, Daley & Driscoll

[57] ABSTRACT

A light quantity adjusting device is provided with a light blocking member for adjusting a quantity of light by moving the light blocking member and a drive source for driving the light blocking member. The drive source includes at least a rotor having a plurality of poles, a stator, a coil and a limiting part arranged to limit the rotation angle range of the rotor to an angle not exceeding 180 degrees. The drive source is arranged such that a cogging torque existing when the coil is not energized works over the whole rotation angle range to cause the rotor to rotate in one direction and, a coil torque generated when the coil is energized works over the whole rotation angle range to cause the rotor to rotate in the other direction. The peak of the coil torque is set to be obtainable within the rotation angle range, and a torque which is obtained by combining the cogging torque and the coil torque works to cause the rotor to rotate in the other direction.

28 Claims, 22 Drawing Sheets

F I G.21
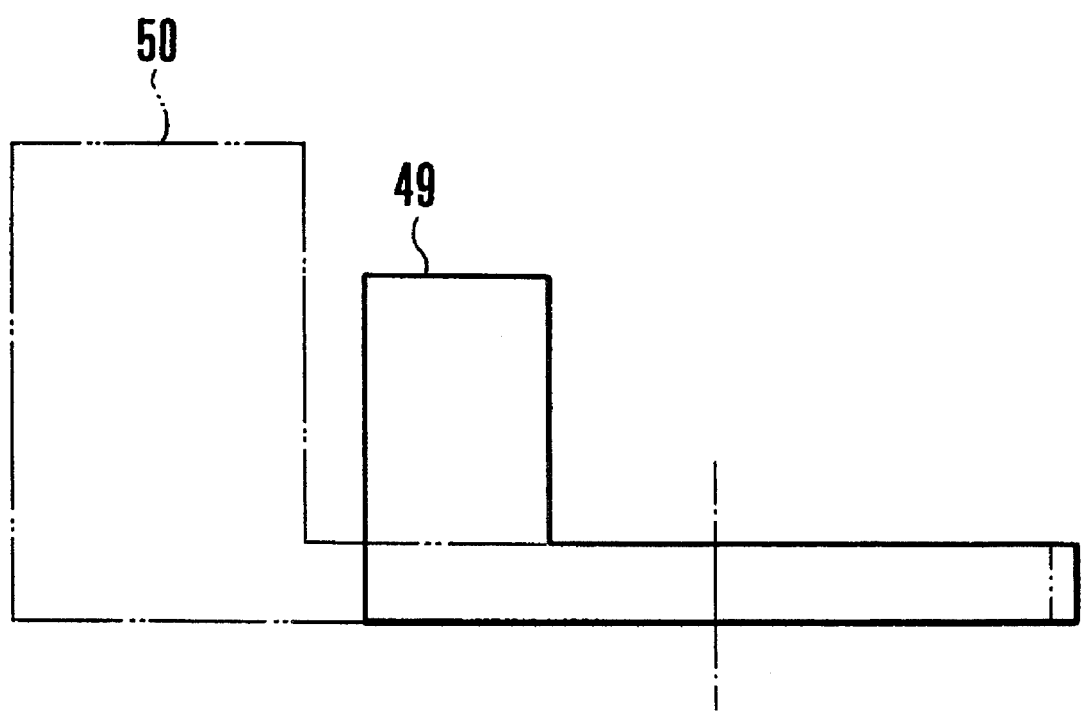

5,489,959

LIGHT QUANTITY ADJUSTING DEVICE

This is a continuation divisional application under 37 CFR 1.62 of prior application Ser. No. 08/167,234, filed Dec. 14, 1993, now abandoned.

BACKGROUND OF THE INVENTION

1. Field of the Invention

This invention relates to a light quantity adjusting device for a camera, a projector or the like.

2. Description of the Related Art

A conventional light quantity adjusting device is described with reference to FIGS. 24(a) and 24(b) as follows: A rotor 113 made of a magnet is magnetized to have two poles and is encompassed with two bobbins 114a and 114b, which are obtained by molding and machining a plastic material. Copper wires are wound around the two bobbins 114a and 114b to form coils 115a and 115b. The bobbins 114a and 114b which are thus provided with the coils 115a and 115b are encompassed with a yoke 119, which is made of soft iron into a ring shape. The rotor 113 is thus arranged to rotate under the influence of a magnetic flux generated when a DC current flows to the coils 115a and 115b. The rotation of the rotor 113 is transmitted through an arm 116 to diaphragm blades 117a and 117b of a diaphragm. The diaphragm blades 117a and 117b then move in the direction of opening the aperture of the diaphragm. A coiled spring (hereinafter referred to as a return spring) 118 is attached to the arm 116 and is arranged to constantly exert a force on the diaphragm blades 117a and 117b in the direction of closing the aperture which is formed jointly by them. A magnetism detecting element 128 such as a Hall element is employed as an angular position detector for detecting the angular position of the rotor 113. The diameter of the aperture formed by the diaphragm blades 117a and 117b is arranged to be enlarged or reduced by electrically adjusting a turning force which is caused by a magnetic action and exerted in the opening direction. An electrical circuit arrangement provided for this purpose is omitted from the description given here.

In the case of the conventional device, the whole outer circumferential part of the rotor 113 is covered with the bobbins 114a and 114b which have the copper wires wound around them. Therefore, as shown in FIG. 24(b), an air gap between the rotor 113 and the ring-shaped yoke 119 inevitably becomes too large. Hence, in order to obtain a driving torque required for light quantity adjustment, it has been necessary either to increase the diameter of the rotor 113 or to use a magnet having a large maximum energy product. This has caused an increase in size of a driving part or necessitated use of an expensive magnet. Further, since the coils 115a and 115b must be located always close to the rotor 113, it has been theoretically impossible to shift their locations. Therefore, it has been hardly possible to increase the efficiency of space utilization. This not only has caused an increase in size of the driving part but also allowed a less amount of latitude of layout to hinder reduction in size of a lens barrel, with respect to matching with the lens barrel. Further, the use of the coiled spring 118 for providing a force required in closing the diaphragm blades 117a and 117b has lowered work efficiency because of difficulty in mounting it and also has greatly hindered the uniformalization in quality of products. Another problem with the conventional device lies in a mechanical friction caused by the coiled spring 118 when the diaphragm blades 117a and 117b make sliding movement. The mechanical friction tends to prevent adequate braking and cause vibrations of the diaphragm blades 117a and 117b.

Further, the terminals of the magnetism detecting element 128 and those of the coils 115a and 115b are arranged not on one and the same plane and also away from each other at a relatively long distance. This arrangement results in a complex shape of a flexible circuit board provided for interconnecting these terminals and thus has caused a poor assembly workability and an increase in cost. A further problem of the conventional device lies in lowered workability caused by a method of fixing the magnetism detecting element 128 by taping.

A method for constantly urging the rotor in one direction by utilizing a cogging torque has been disclosed in Japanese Utility Model Application Laid-Open No. HEI 3-29837. According to the method disclosed, the rotor is urged in one direction by the cogging torque when the coil is not energized and in the other direction by a composite torque obtained from an energization torque and the cogging torque when the coil is energized.

Further, the driving part of a light quantity adjusting device according to this invention completely differs in uses from such stepping motors that are described in Japanese Patent Application Laid-Open No. SHO 57-68661, Japanese Patent Application Laid-Open No. SHO 55-133663, etc. The driving part of this invention is uniquely arranged, particularly with respect to driving control over the diaphragm of a camera.

SUMMARY OF THE INVENTION

One aspect of this invention resides in the provision of a light quantity adjusting device, wherein the phase of a cogging torque and that of a coil torque generated by a coil deviate from each other in such a manner that the cogging torque works to cause a rotor to rotate in one direction over the whole rotation angle range of the rotor, the coil torque works to cause the rotor to rotate in the other direction, the peak of the coil torque arises within the rotation angle range, and a composite torque obtained by combining the cogging torque and the coil torque works to cause the rotor to rotate in the other direction over the whole rotation angle range.

The above and other aspects and features of this invention will become apparent from the following detailed description of embodiments thereof taken in conjunction with the accompanying drawings.

BRIEF DESCRIPTION OF THE DRAWINGS

FIG. 21 shows the shape of the fifth embodiment in comparison with that of the conventional device.

DETAILED DESCRIPTION OF THE PREFERRED EMBODIMENTS

(First Embodiment)

Figure 1:
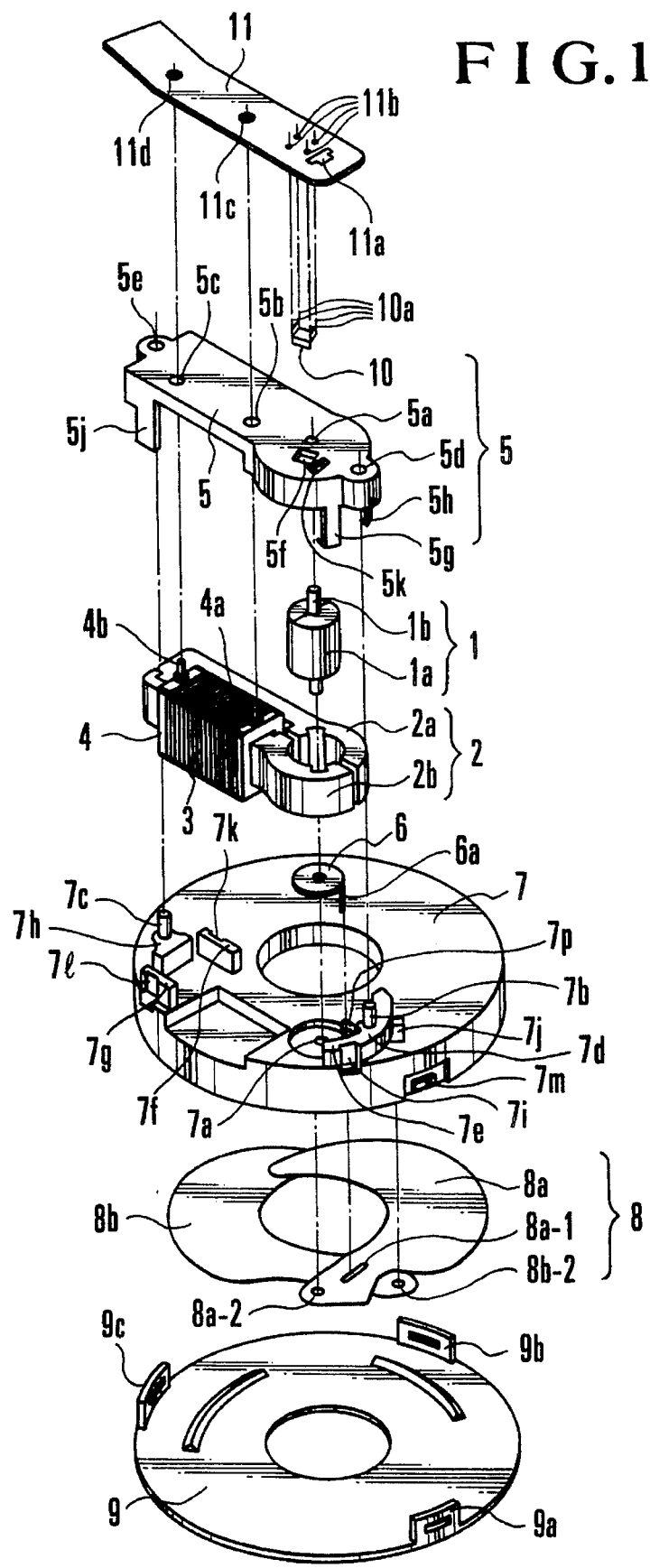
FIG. 1 is an exploded oblique view showing in outline the essential parts of a light quantity adjusting device arranged as a first embodiment thereof.

FIG. 1 is an exploded oblique view showing in outline the arrangement of the essential parts of a light quantity adjusting device which is arranged according to this invention as a first embodiment thereof. The light quantity adjusting device includes a rotor 1, a stator yoke 2, a coil 3, a bobbin 4, a cap 5, an arm 6, a base plate 7, a diaphragm blade group 8, a lid 9, a magnetism detecting element (Hall element) 10 and a flexible circuit board 11.

Referring to FIG. 1, the rotor 1 consists of a cylindrical magnet part 1a which is made of a neodymium-iron-boron system magnet and is magnetized to have two poles and a rotation shaft 1b which is secured to the magnet part 1a by means of an adhesive or the like. The stator yoke 2 is formed, for example, by laminating silicon steel plates and by joining a first stator yoke piece 2a and a second stator yoke piece 2b together on one side of each of them. The coil 3 is wound around the bobbin 4 which is obtained by molding and machining a plastic material. The bobbin 4 is provided with terminals 4a and 4b for the coil 3. The cap 5 is obtained, for example, by molding and machining a plastic material and is provided with a bearing 5a, coil terminal inserting holes 5b and 5c, positioning holes 5d and 5e, pinching (or sandwiching) pieces 5g to 5j (piece 5i being not shown) which have locking claws, a magnetism detecting element mounting hole 5f and a flexible circuit board hooking piece 5k. The arm 6 is obtained, for example, by molding and machining a plastic material and is provided with a protruding piece 6a. The base plate 7 is obtained, for example, by molding and machining a plastic material and is provided with a bearing 7a, positioning protruding pieces 7b to 7h, pinching piece engaging groove 7i to 7o (grooves 7n and 7o being not shown) and an arm moving window 7p which is arranged to serve also as a stopper for stopping the rotation of the rotor 1. The diaphragm blade group 8 consists of a pair of diaphragm blades 8a and 8b which are made of a resin or the like. The diaphragm blade group 8 is provided with rotation center holes 8a-2 and 8b-2 and sliding slots 8a-1 and 8b-1. The magnetism detecting element 10 is, for example, a Hall element or the like and is arranged to convert a magnetic amount into an electric amount. The flexible circuit board 11 is made of, for example, a polyimide resin and is provided with a hooking hole 11a and terminal holes 11b to 11d.

The rotor 1 has the two ends of its rotation shaft 1b borne by the first bearing 5a which is provided on the cap 5 and the second bearing 7a which is provided on the base plate 7. The rotor 1 is thus arranged to be rotatable. Further, the arm 6 is secured to the rotor 1 by a known method such as press fitting in such a way as to have it in a predetermined relation to the magnetized position of the magnet part 1a. The pair of stator yoke pieces 2a and 2b are arranged to be very close to the outer circumferential part of the magnet part 1a at one end of the pair and joined together at the other end. The stator yoke piece 2b is inserted in the coil 3. In other words, a magnetic circuit is formed by the rotor 1, the stator yoke 2 and the coil 3.

Further, the magnet part 1a of the rotor 1 is arranged to protrude a little above the upper side face of the stator yoke 2. This arrangement is made for the purpose of allowing the magnetism detecting element 10 to detect only a leakage flux flying from the upper part of the rotor 1 without being affected by a magnetic flux between the stator yoke 2 and the rotor 1.

Figure 2A:
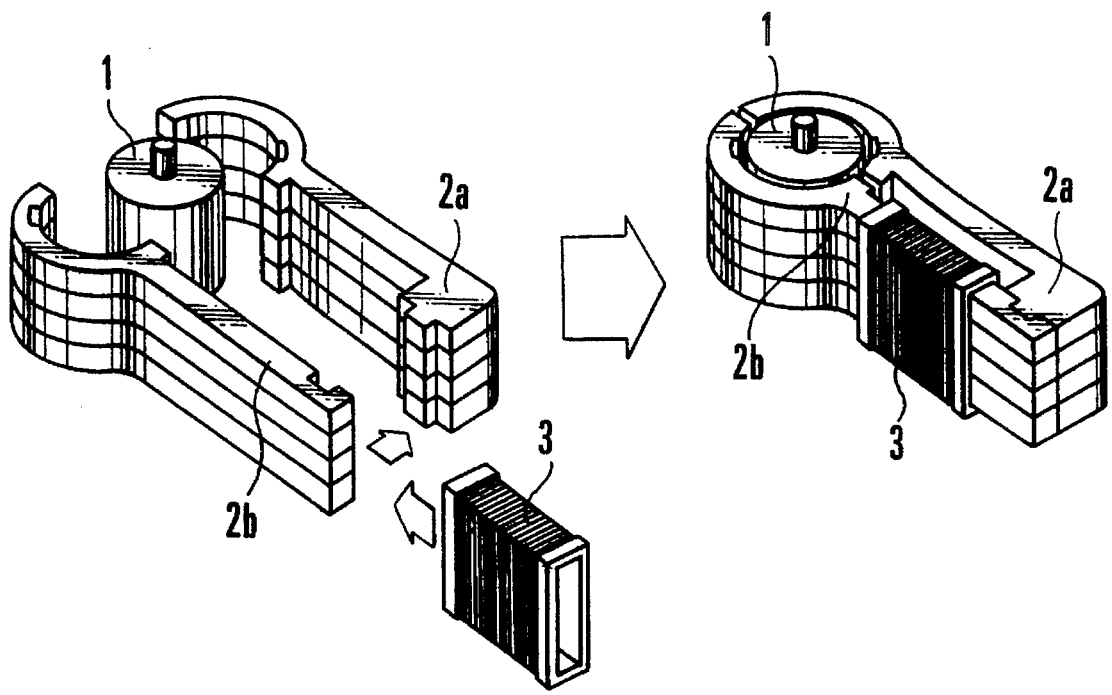
FIGS. 2(a) and 2(b) are oblique views showing how the halves of a stator yoke shown in FIG. 1 are joined on to each other.
Figure 2B:
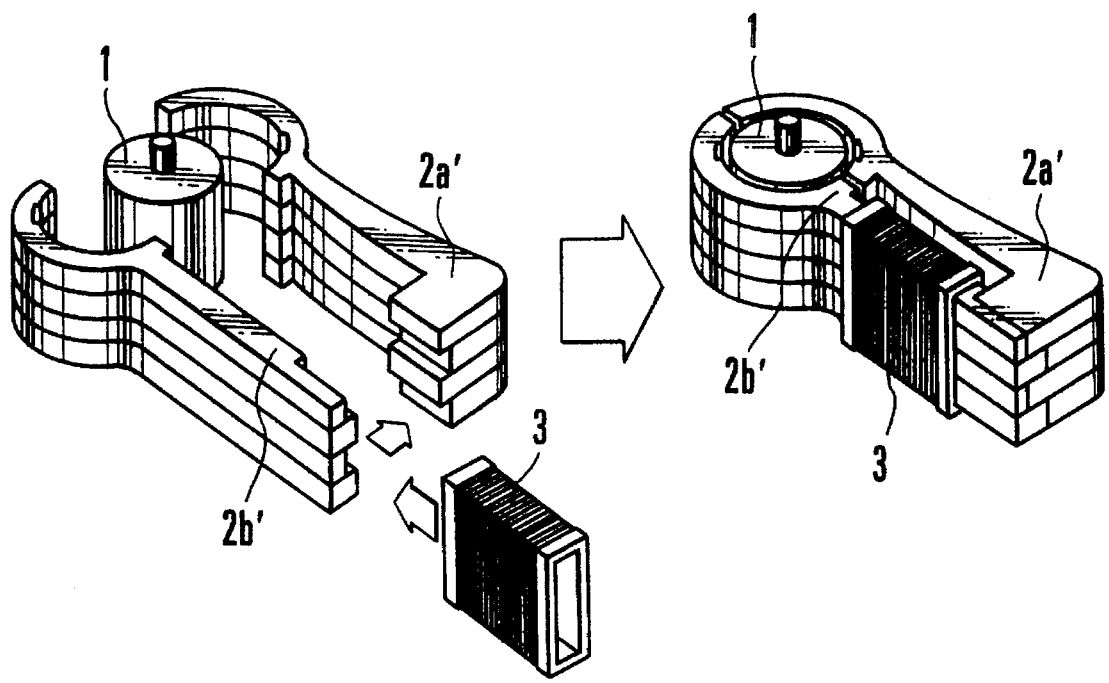

FIGS. 2(a) and 2(b) show a joined state of the stator yoke 2. The two stator yoke pieces 2a and 2b or 2a' and 2b' are respectively provided with protruding and recessed parts and are thus arranged to be fittingly engaged together. This arrangement gives a tight joint to avoid any imperfectly joined state, so that a sufficient amount of magnetic flux can be allowed to pass through the joint. The tight joint thus contributes to stabilization of the magnetic circuit.

The rotor 1 and the stator yoke 2 which is provided with the coil 3 are positioned and mounted on the base plate 7 by causing them to fittingly engage the protruding pieces 7d to 7h provided on the base plate 7. Among the protruding pieces, the protruding pieces 7f and 7g are elastic and arranged as pinching pieces to pinch the stator yoke 2 with elasticity to prevent the joined parts of it from parting when the stator yoke 2 is mounted.

Figure 3A:
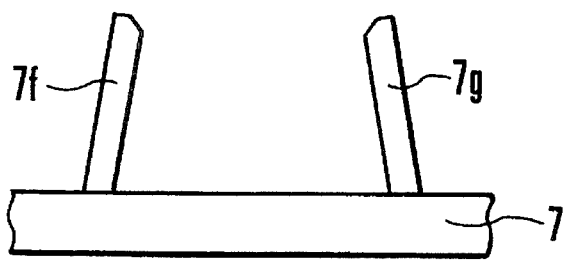
FIGS. 3(a), 3(b), 3(c) and 3(d) are plan views showing a pinching manner of the stator yoke pieces shown in FIG. 1.
Figure 3B:
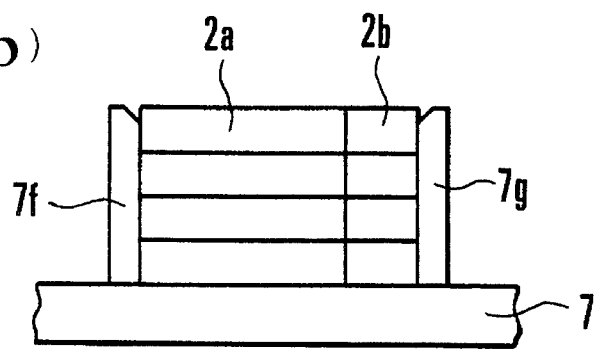

FIGS. 3(a) to 3(d) show the state of pinching mounting mentioned above. The protruding pieces 7f and 7g are somewhat slanting inward toward each other as shown in FIG. 3(a). When the stator yoke 2 is inserted in between the protruding pieces 7f and 7g, the protruding pieces 7f and 7g which are pinching pieces flex to widen a space between them accordingly as the stator yoke 2 is inserted further. Upon completion of insertion, the stator yoke 2 is fixedly carried by these protruding pieces 7f and 7g with their resilient forces exerted toward the joint between the stator yoke pieces 2a and 2b as shown in FIG. 3(b). With the stator yoke 2 fitted on and pinched by the protruding pieces 7d to 7h provided on the base plate 7 in this manner, the magnetic circuit is stably formed.

Figure 4:
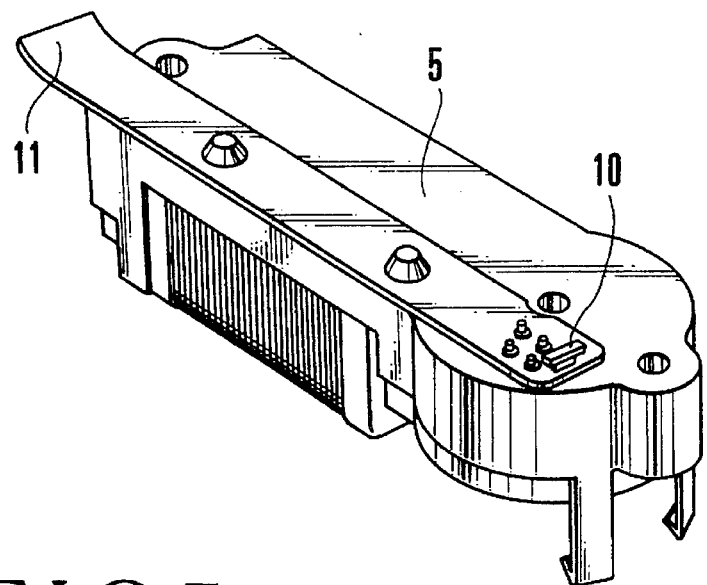
FIG. 4 is an oblique view showing how a cap shown in FIG. 1 is secured to a flexible circuit board.

Referring to FIG. 1, with the pinching pieces 5g to 5j of the cap 5 which have the locking claws inserted into and engaged with the pinching piece engaging grooves 7i to 7l of the base plate 7 and with the protruding pieces 7b and 7c of the base plate 7 fittingly inserted into and engaged with the positioning holes 5d and 5e of the cap 5, the magnetic circuit which is formed by the rotor 1, the stator yoke 2 and the coil 3 and fixedly carried by the base plate 7 is completely fixed in a state of being pushed from two opposite directions by the base plate 7 and the cap 5. Under this condition, the coil terminals 4a and 4b are inserted in the coil terminal holes 5b and 5c of the cap 5 to have the coil 3 positioned by the fitting engagement of these parts. Further, the magnetism detecting element 10 mounted on the flexible circuit board 11 is inserted in the magnetism detecting element mounting hole 5f of the cap 5. The flexible circuit board 11 is fixed in place with the hooking piece 5k which is provided on the cap 5 engaging the hooking hole 11a provided in the flexible circuit board 11 and with the coil terminals 4a and 4b soldered to the flexible circuit board 11. FIG. 4 shows the fixing arrangement.

According to the fixing arrangement shown in FIG. 4, input and output terminals are gathered together on the upper surface of the cap 5 to permit wiring lines to be gathered together on the upper surface of the cap 5, so that the flexible circuit board 11 which otherwise must be arranged in a complex shape to have many branches according to the conventional arrangement can be simply arranged in a single piece. Therefore, flexible circuit board mounting work which has been troublesome according to the conventional arrangement can be greatly simplified to enhance the efficiency of the work.

Figure 17:
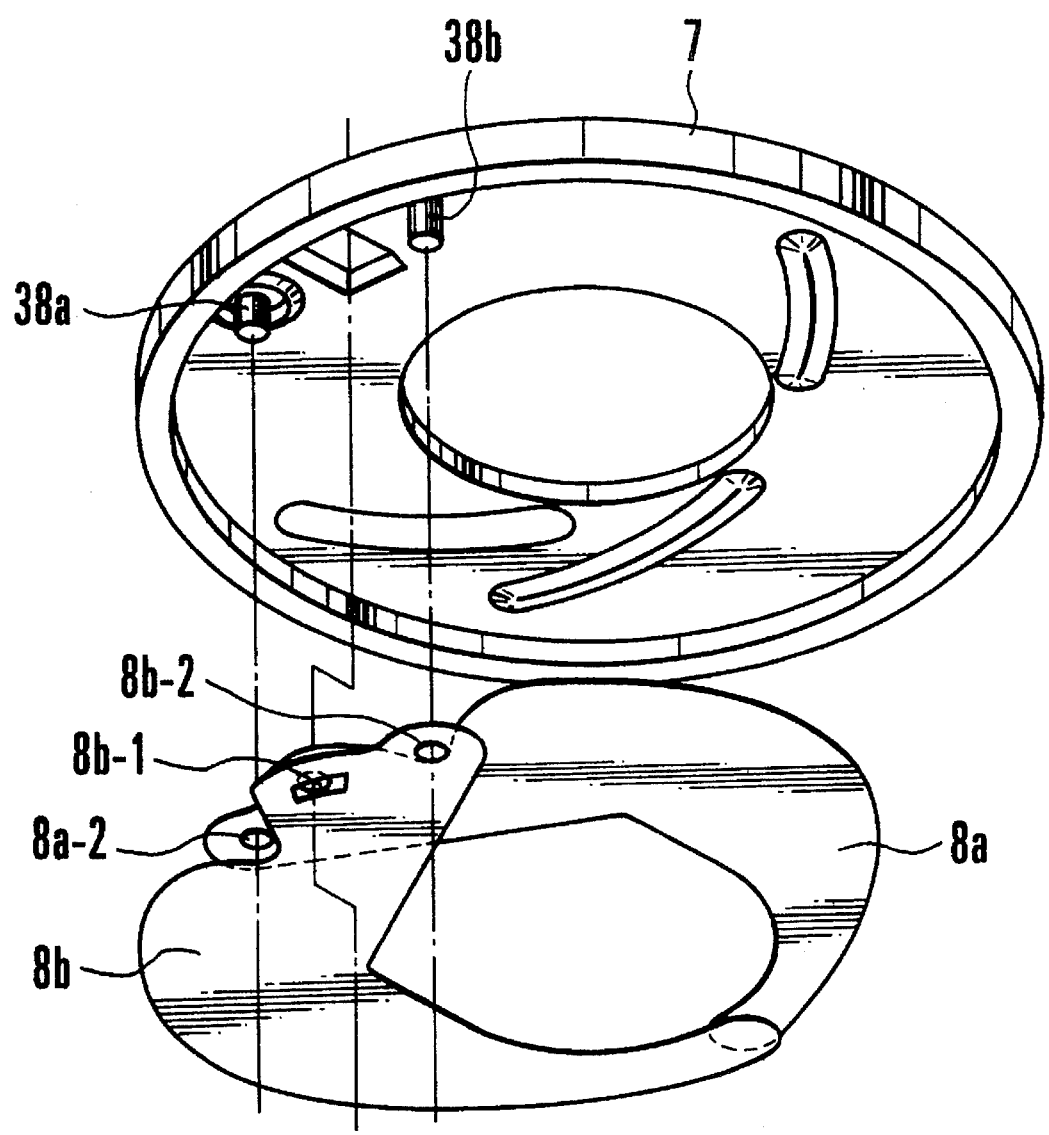
FIG. 17 is an oblique view showing fitting engagement of diaphragm blades and a base plate of the fourth embodiment of this invention.

Referring to FIG. 1, the diaphragm blade group 8 has its sliding slots 8a-1 and 8a-2 fitted on the protruding piece 6a, which protrudes from the arm moving window 7p of the base plate 7, and its rotation center holes 8a-2 and 8b-2 fitted on projections 38a and 38b which protrude from the base plate 7 as shown in FIG. 17. Therefore, when the protruding piece 6a of the arm 6 works following the rotation of the rotor 1, the diaphragm blade group 8 moves in association with the arm 6 around the rotation center holes 8a-2 and 8b-2, so that the diaphragm aperture can be varied. The range of rotation of the rotor 1 is restricted and brought to a stop when the protruding piece 6a comes to impinge upon the stopper part of the arm moving window 7p. The lid 9 is arranged to be fixed in place when its pinching pieces 9a to 9c engage the pinching piece engaging grooves 7m to 7o formed in the base plate 7.

Figure 5:
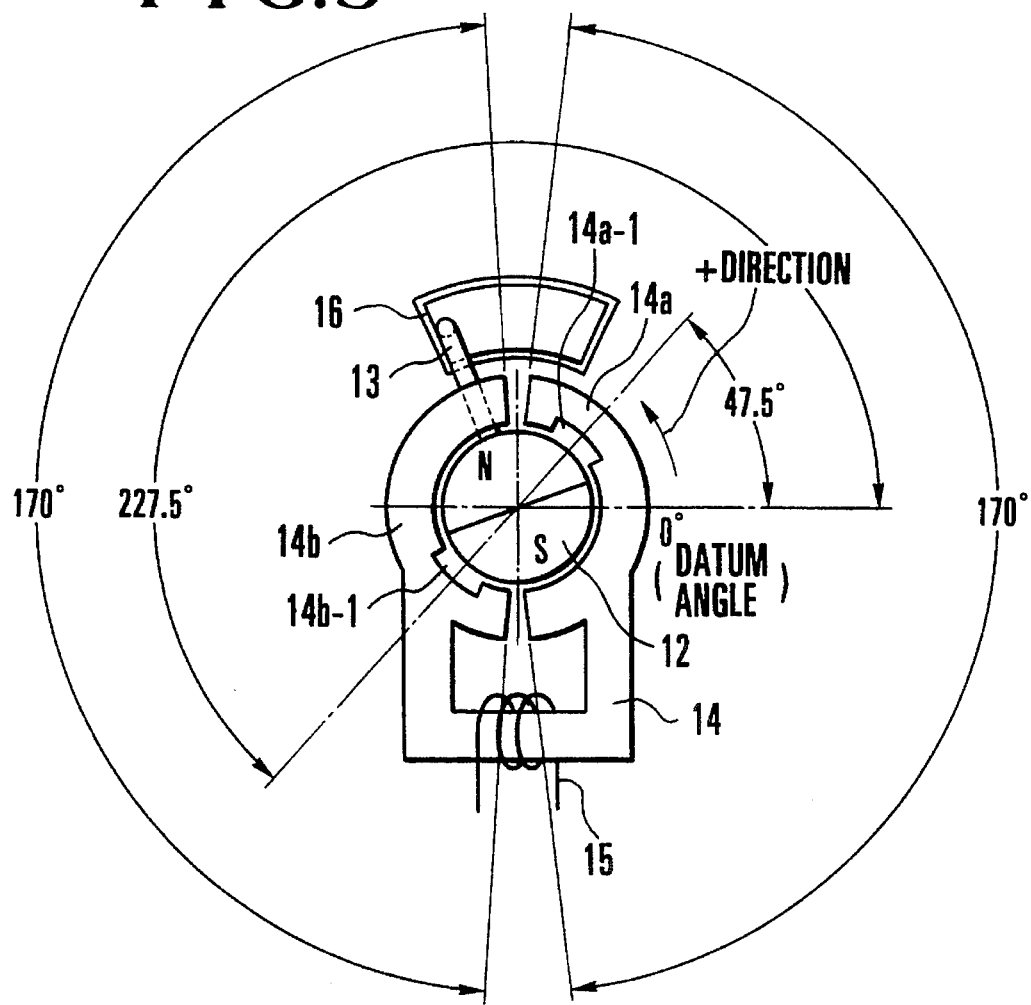
FIG. 5 schematically shows a magnetic circuit of the light quantity adjusting device which is arranged as the first embodiment of this invention.

The operation of the light quantity adjusting device which is arranged as the embodiment described above is described as follows with reference to FIG. 5 which schematically shows the magnetic circuit: In FIG. 5, reference numeral 12 denotes a rotor, which is carried by a shaft to be rotatable thereon. The rotor 12 is provided with an arm 13 which is arranged to be movable in association with the rotation of the rotor 12. Reference numeral 14 denotes a stator yoke. The stator yoke 14 has first and second opposed parts 14a and 14b which are opposed to the rotor 12 and are respectively provided with first and second grooves 14a-1 and 14b-1. Assuming that the opening angle of the first opposed part 14a is 170° and that of the second opposed part 14b also 170°, for example, the first groove 14a-1 is located at 47.5° from a datum angle and the second groove 14b-1 at 227.5° as shown in FIG. 5. Reference numeral 15 denotes a coil. The coil 15 is wound around a part of the stator yoke 14. Reference numeral 16 denotes a stopper. When the arm 13 comes into contact with the stopper 16, the swing of the arm 13 in one direction comes to a stop at the stopper 16.

FIG. 5 shows the device in a state of not being energized (hereinafter referred to as a nonenergized state). In the nonenergized state, the rotor 12 is kept in a position shown in FIG. 5. An attempt to rotate the rotor 12 counterclockwise ("−" direction) from this state causes the rotor 12 to receive a force exerted in the counterclockwise direction ("+" direction). This force is called a cogging force, which results from a change in reluctance of the stator and the rotor according to the angle of rotation. In the case of the light quantity adjusting device according to this invention, the cogging force which is of such a nature is utilized in place of the force of a spring employed by the conventional device. Further, the cogging force naturally acts also when the device is in an energized state.

Figure 6:
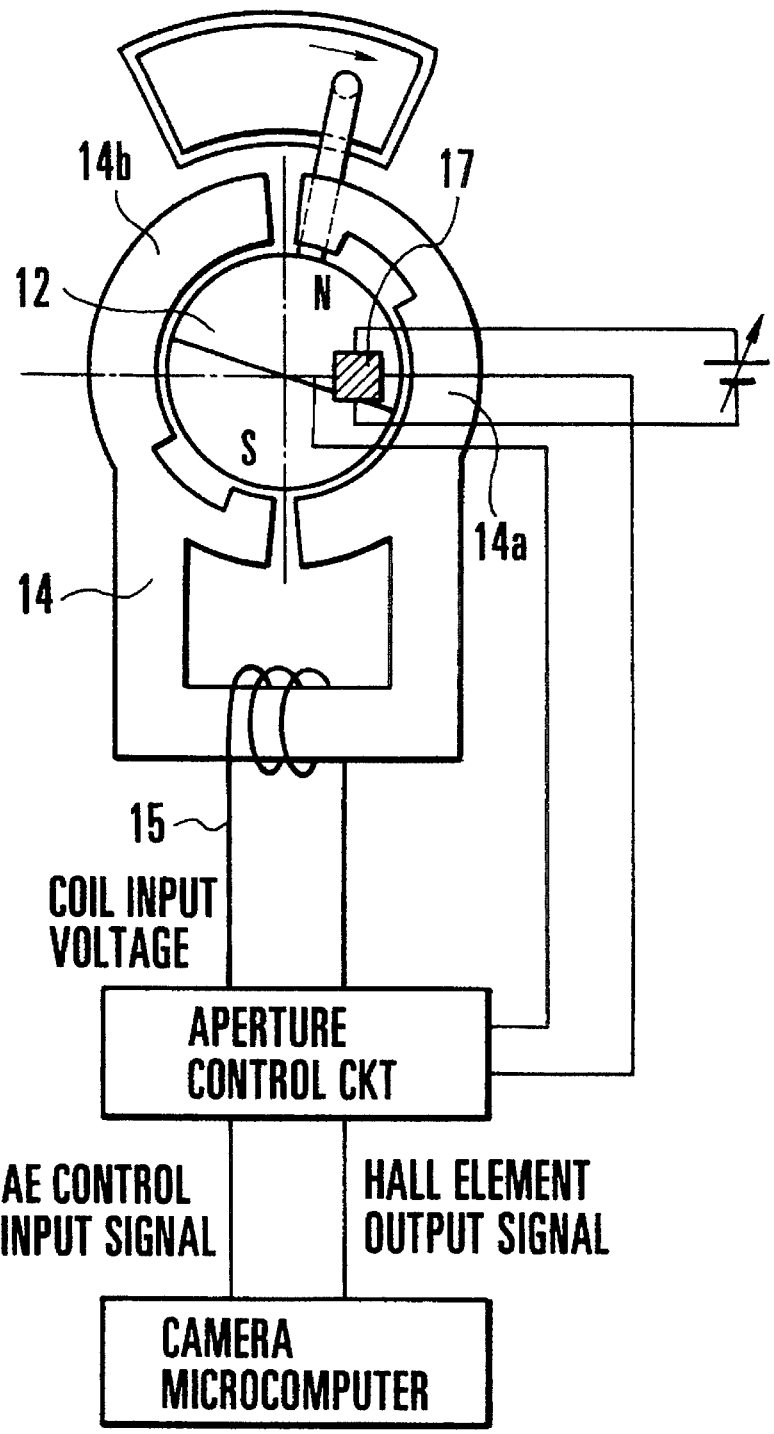
FIG. 6 schematically shows the magnetic circuit of the device of FIG. 5 which is in an energized state.

FIG. 6 shows the device in an energized state. A camera microcomputer which is an essential part of a driving part within a video camera is arranged to send out an AE (automatic exposure) control input signal which indicates information on a desired value of the diaphragm aperture. When the AE control input signal is applied via an aperture control circuit to the coil 15 as a coil input voltage, a current flows to generate a magnetic field at the coil 15. An S pole is then excited in the first opposed part 14a of the stator yoke 14 and an N pole in the second opposed part 14b. Since the opposite poles mutually attract, a torque is generated at the rotor 12 (a torque generated by the coil). The torque causes the rotor 12 to rotate clockwise (in the "−" direction). When the rotor 12 rotates, a magnetic flux which pierces a stationary magnetism detecting element, or a Hall element, 17 changes. As a result, a voltage is generated in the Hall element 17 by the Hall effect. The voltage thus generated and outputted from the Hall element 17 is inputted to the camera microcomputer via the aperture control circuit as information on the rotation angle of the rotor 12. The camera microcomputer then outputs a next control signal through various processes. These processes are repeated, so that the rotor 12 can be brought to a desired angular position. The diaphragm blade group 8 which is connected to the protruding piece 6a of the arm 6 as shown in FIG. 1 is then opened and closed in association with the rotation of the rotor 1 and the arm 6.

Figure 7:
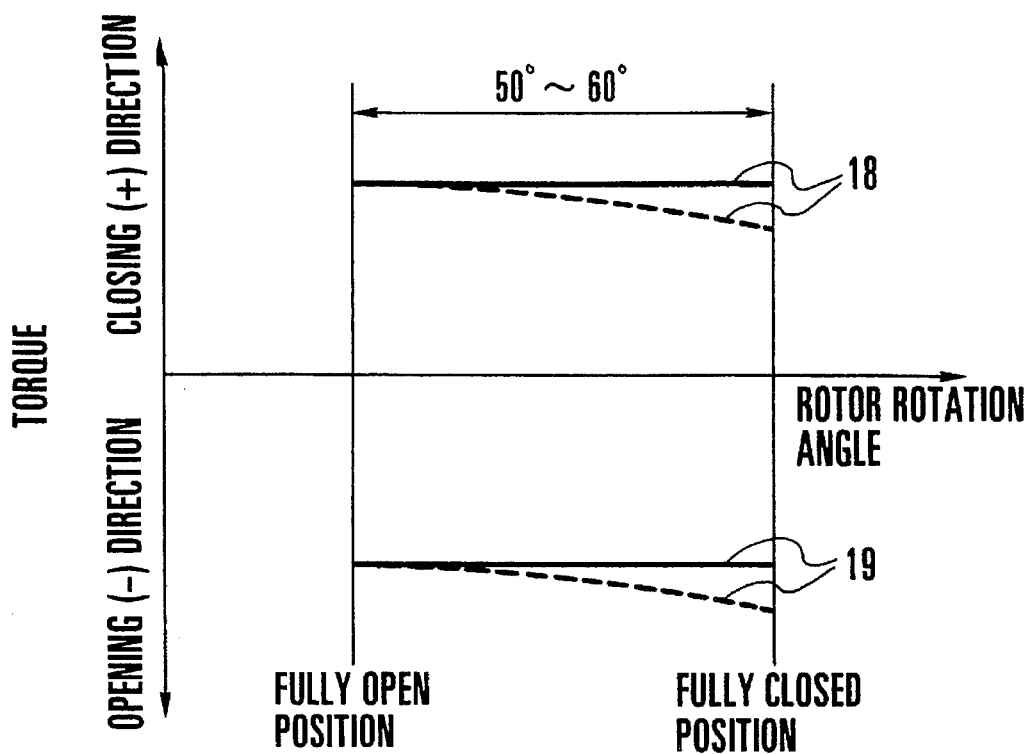
FIG. 7 shows an ideal torque characteristic of a light quantity adjusting device.

The light quantity adjusting device to be used, for example, for a video camera must have a characteristic of torque which is as shown in FIG. 7 in relation to the rotation angle of the rotor. In FIG. 7, reference numerals 18 and 19 denote torques each of which is obtained by combining a torque generated by the coil with a cogging torque. The torque characteristic is required to meet the following conditions:

(1) The torque obtained by combining the torque generated by the coil and the cogging torque must act in the direction of closing over a whole range from a full open position to a full closed position at the time of nonenergization, as represented by the line 18 in FIG. 7, and must act in the direction of opening over the whole range when the coil is energized as represented by the line 19.

(2) In order to increase the safety of control, the torque obtained by combining the torque generated by the coil and the cogging torque must have, with the same current allowed to flow, a characteristic showing a value which remains nearly the same or slightly decreases accordingly as the rotor rotates in the direction of opening.

(3) The rotation angle range of the rotor, from the full open position to the full closed position, must be from 50° to 60°.

Figure 8:
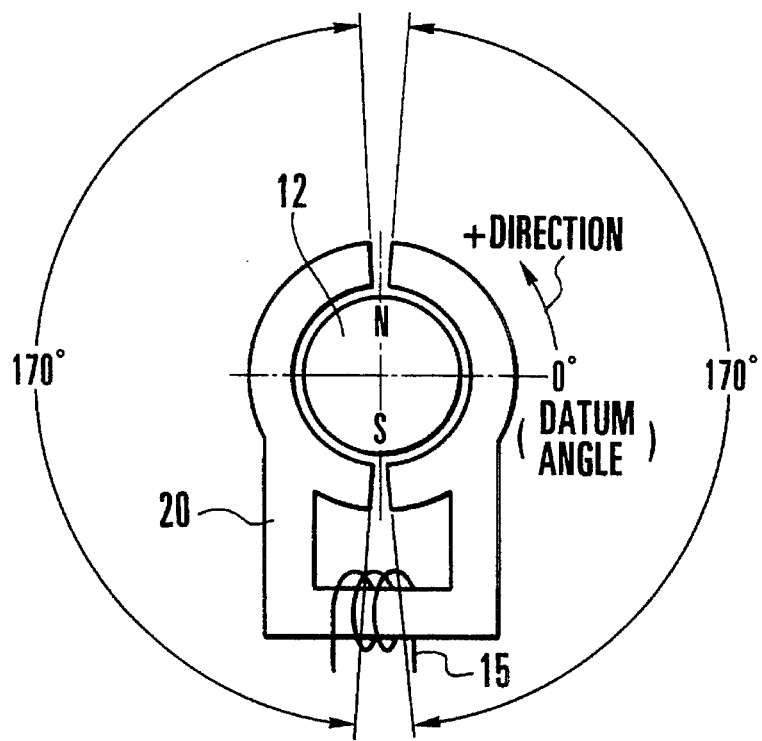
FIG. 8 schematically shows a magnetic circuit which has no groove in a stator yoke and which serves as the premise of which this invention is contrived.
Figure 9:
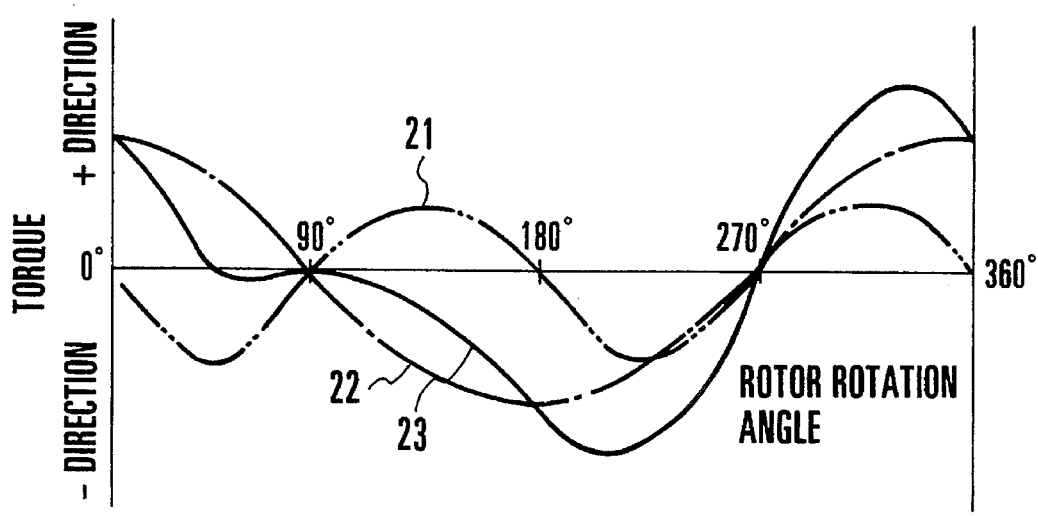
FIG. 9 shows a torque characteristic obtained with no groove provided in the stator yoke.

FIG. 8 shows a magnetic circuit as a model in which no groove is provided in the stator yoke. In this case, with the positional relation between the stator yoke 20 and the rotor 12 set at its initial point of 0°, when the rotor 12 is caused to make one rotation in the "+" direction, the torque characteristic becomes as shown in FIG. 9. In FIG. 9, the illustration includes a cogging torque 21, a torque 22 generated by the coil and a torque 23 obtained by combining the cogging torque 21 with the coil-generated torque 22.

As apparent from FIG. 9, the torque obtained with the cogging torque combined with, i.e., added to, the coil-generated torque fails to have such a characteristic that satisfies all the above-stated conditions which are (1) to have the torque act in the direction of closing over the whole range from the full open position to the full closed position at the time of nonenergization (when the coil is not energized) and to act in the direction of opening over the whole range at the time of energization; (2) to have a torque curve which either remains at about the same value or becomes slightly lower accordingly as the rotor rotates in the opening direction with the same current allowed to flow; and (3) the rotation angle range of the rotor from the full open position to the full closed position is from 50° to 60° or thereabout. The magnetic circuit having the stator yoke arranged in the shape as shown in FIG. 8 is, therefore, inapposite to the drive source of the light quantity adjusting device.

Figure 10:
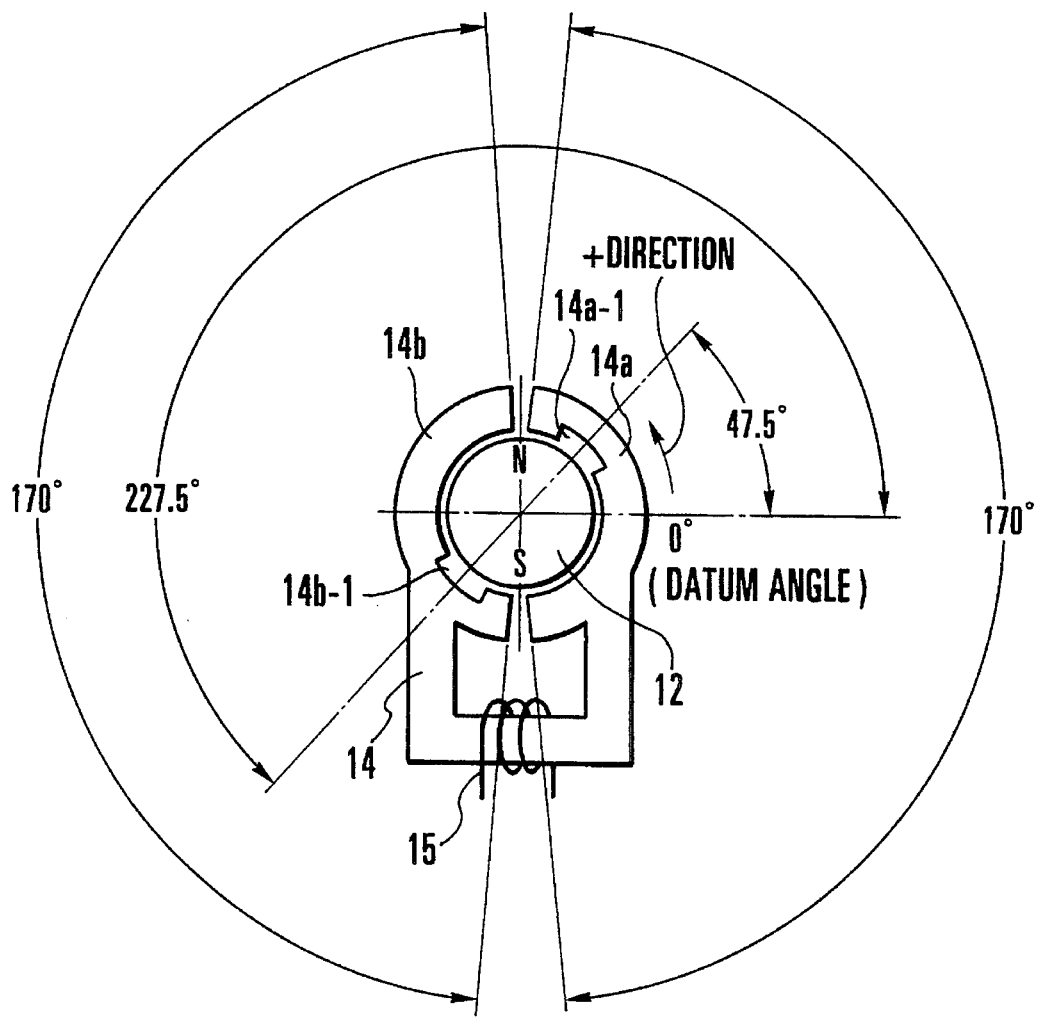
FIG. 10 schematically shows a magnetic circuit obtained with grooves provided in the stator yoke of the first embodiment of this invention.

FIG. 10 schematically shows a magnetic circuit which serves as the drive source of the light quantity adjusting device arranged according to this invention as its first embodiment. The first and second opposed parts 14a and 14b of the stator yoke 14 are respectively provided with the first groove 14a-1 and the second groove 14b-1, which are located in the following positions: When the first opposed part 14a is, for example, at an opening angle of 170° and the second opposed part 14b also at the opening angle of 170°, the first groove 14a-1 is located for example, at an angle of 47.5° from a datum angle and the second groove 14b-1 at an angle of 227.5°.

Figure 11:
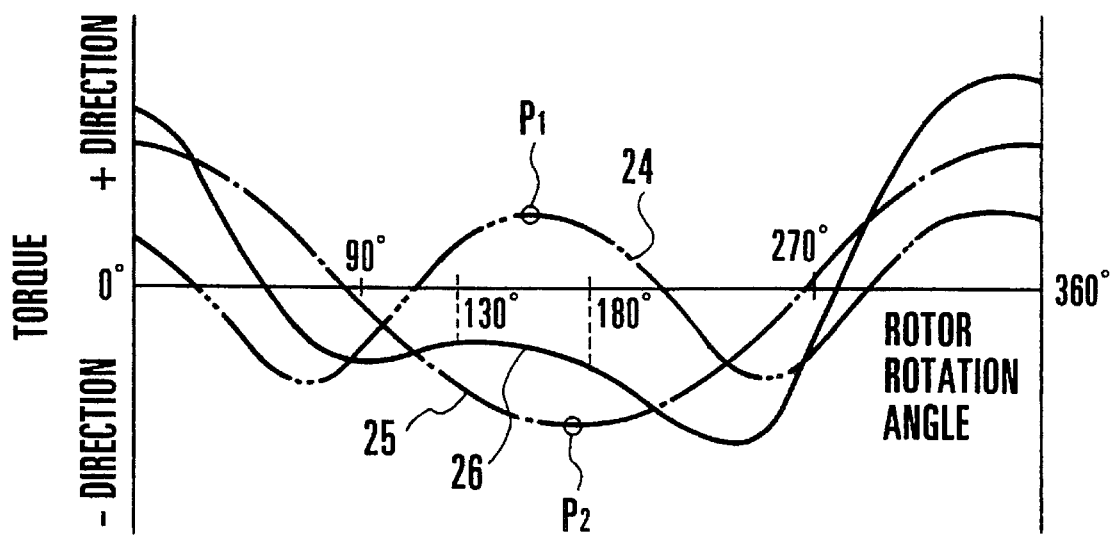
FIG. 11 shows a torque characteristic obtained with the grooves provided in the stator yoke of the first embodiment of this invention.

With the magnetic circuit arranged in this manner, when a constant current is allowed to flow to the coil 15 to cause the rotor 12 to make one rotation in the "+" direction from an initial state of having the stator yoke 14 and the rotor 12 in a positional relation as shown in FIG. 10, the torque characteristic in relation to the rotation angle of the rotor 12 becomes as shown in FIG. 11. In FIG. 11, the illustration includes a cogging torque 24, a torque 25 which is generated by the coil and a torque 26 which is obtained by adding the cogging torque 24 to the coil-generated torque 25. As shown in FIG. 11, the phase of the cogging torque 24 and that of the coil-generated torque 25 deviate from each other, thereby giving a characteristic which satisfies the above conditions approximately within a range between 130° and 180°. Further, the cogging torque 24 is set in such a way as to have a peak P1 of its component in the "+" direction and the torque 25 generated by the coil to have a peak P2 of its component in the "−" direction, respectively, within the range of 130° to 180°.

The positional relations between the rotor 12 and the arm 13 and between the arm 13 and the stopper 16 are set, on the basis of the characteristic thus obtained, in such a way as to allow the use of the magnetic circuit, for example, within the range of the rotation angle of the rotor from 130° to 180°. Then the rotor 12 and the arm 13 can be rotated within such a range.

With the grooves provided in the stator yoke in the predetermined positions in the manner described above, the desired torque can be obtained by the driving part of the light quantity adjusting device. The arrangement described lessens an air gap between the rotor and the stator yoke to permit reduction in size of the light quantity adjusting device. Further, since the coil can be disposed in any position as desired, the light quantity adjusting device can be well matched with the lens barrel for reduction in size of the latter. Besides, since the invented arrangement obviates the necessity of the use of a coiled return spring for supplying a force in the direction of closing the diaphragm blades, the embodiment completely precludes the possibility of any insufficient braking heretofore caused by a mechanical friction at the time of sliding movement of the coiled return spring. The invented arrangement thus contributes to the enhancement of efficiency of the device and the efficiency of assembly work as the number of assembly processes can be lessened.

Figure 18:
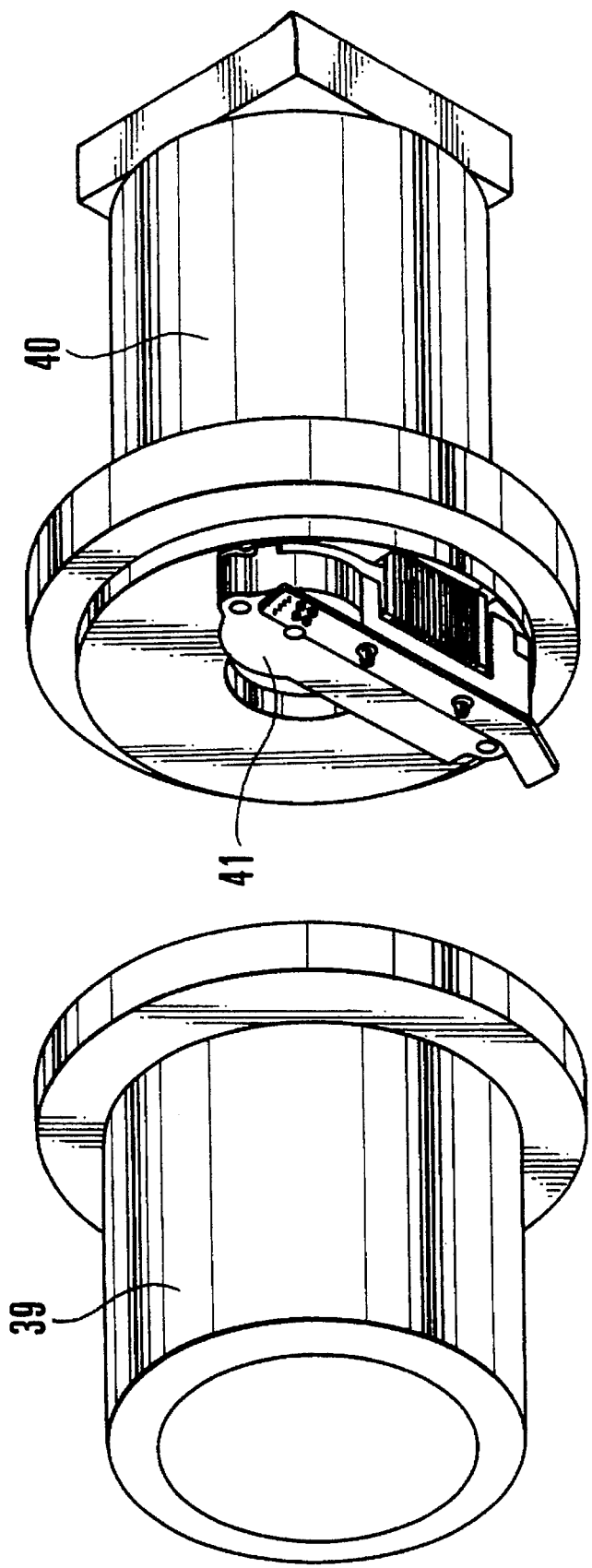
FIG. 18 is an oblique view of the light quantity adjusting device of the first embodiment in a state of being incorporated in a lens barrel.

FIG. 18 shows the light quantity adjusting device of this invention in a state of having been set in a lens barrel. In FIG. 18, reference numeral 39 denotes an A lens tube. Reference numeral 40 denotes a C lens tube. Reference numeral 41 denotes the light quantity adjusting device of this invention. The light quantity adjusting device 41 is mounted on the side of the C lens tube 40. The light quantity adjusting device 41 of this invention is completely fixed in place by connecting the A lens tube 39 to the C lens tube 40 with screws or in some other known manner.

(Second Embodiment)

In the case of the first embodiment of this invention described above, a desired torque characteristic is obtained by providing grooves in the stator yoke in such a way as to shift the phase relation between the cogging torque and the torque generated by the coil. The same advantage is, however, attainable also by arranging some magnetic pieces as interpoles.

Figure 12:
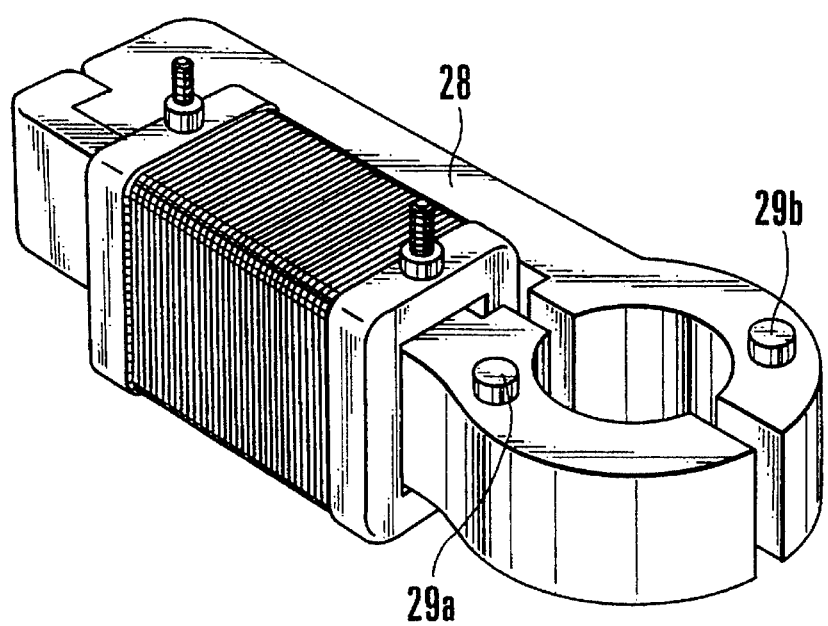
FIG. 12 is an oblique view showing a magnetic circuit which shows a feature of a second embodiment of this invention.
Figure 13:
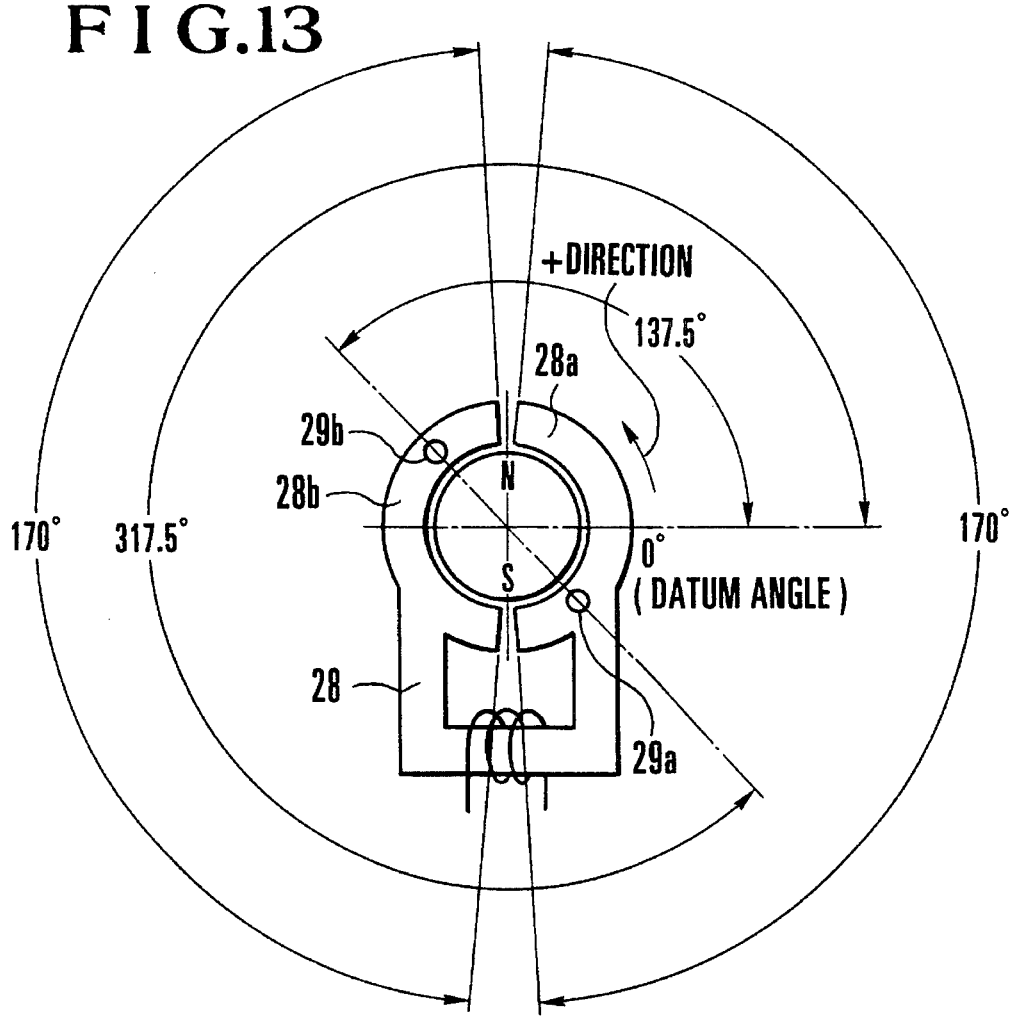
FIG. 13 schematically shows the magnetic circuit showing the feature of the second embodiment.

FIG. 12 shows the magnetic circuit arrangement of a light quantity adjusting device arranged as a second embodiment of this invention. Referring to FIG. 12, interpoles 29a and 29b which are magnetic pieces are secured to a stator yoke 28 or a base plate by a known method such as press fitting. The interpoles 29a and 29b are arranged in the following positions: With the opening angle of a first opposed part 28a of the stator yoke 28 assumed to be 170° and that of a second opposed part 28b to be also 170° in the magnetic circuit which is schematically shown in FIG. 13, the first interpole 29a is disposed, for example, at 317.5° and the second interpole 29b at 137.5° with respect to a datum angle.

With the embodiment arranged in this manner, the magnetic peak point of the rotor and the interpoles 29a and 29b attract each other with magnetic suction forces. Therefore, compared with a case where no interpole is provided, the phase relation between the cogging torque and the torque generated by the coil can be effectively shifted to give the same torque characteristic as the one shown in FIG. 11. The arrangement thus gives a drive source apposite to a light quantity adjusting device. The arrangement of having the interpoles provided either on the base plate or the stator yoke has another advantage, which is as follows: Unlike a case where an air gap between the rotor and the stator yoke is enlarged in part by arranging grooves, like the first embodiment, the arrangement of the second embodiment gives a uniform air gap, so that the effect of a magnetic field generated by the coil can be more effectively transmitted to the rotor. This arrangement thus enables the coil to generate a stronger torque. Therefore, the coil can be arranged to have a smaller diameter for reduction in size of the light quantity adjusting device. It is a further advantage of the second embodiment that, since the torque phases are shifted by means of the interpoles which are parts irrelative to the stator yoke, the dependability on the precision of parts is lower than the arrangement of forming the grooves in the stator yoke, so that the light quantity adjusting device can be arranged at a lower cost.

(Third Embodiment)

While the desired torque characteristic is obtained by forming the grooves in the predetermined parts of the stator yoke to shift the phase relation between the cogging torque and the torque generated by the coil in the case of the first embodiment, the same advantageous effect is attainable by providing some protruding parts, instead of the grooves, in predetermined parts of the stator yoke.

Figure 14:
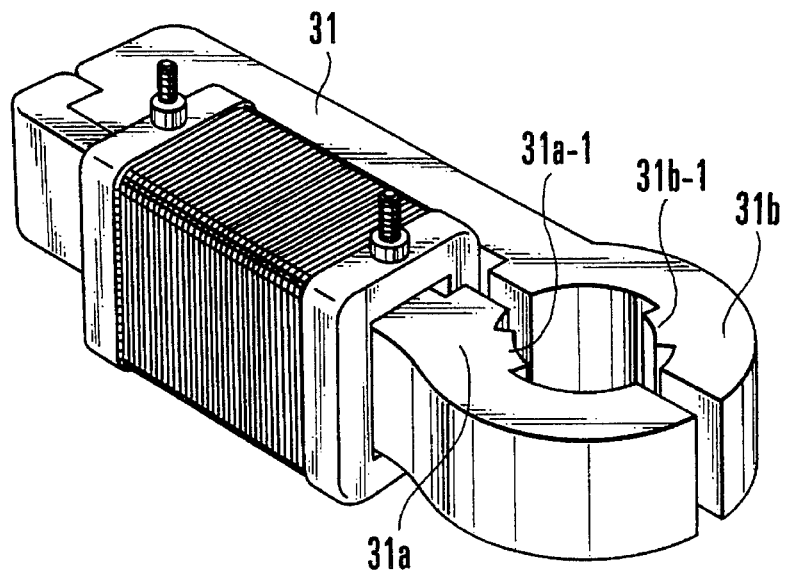
FIG. 14 is an oblique view showing a magnetic circuit which shows a feature of a third embodiment of this invention.
Figure 15:
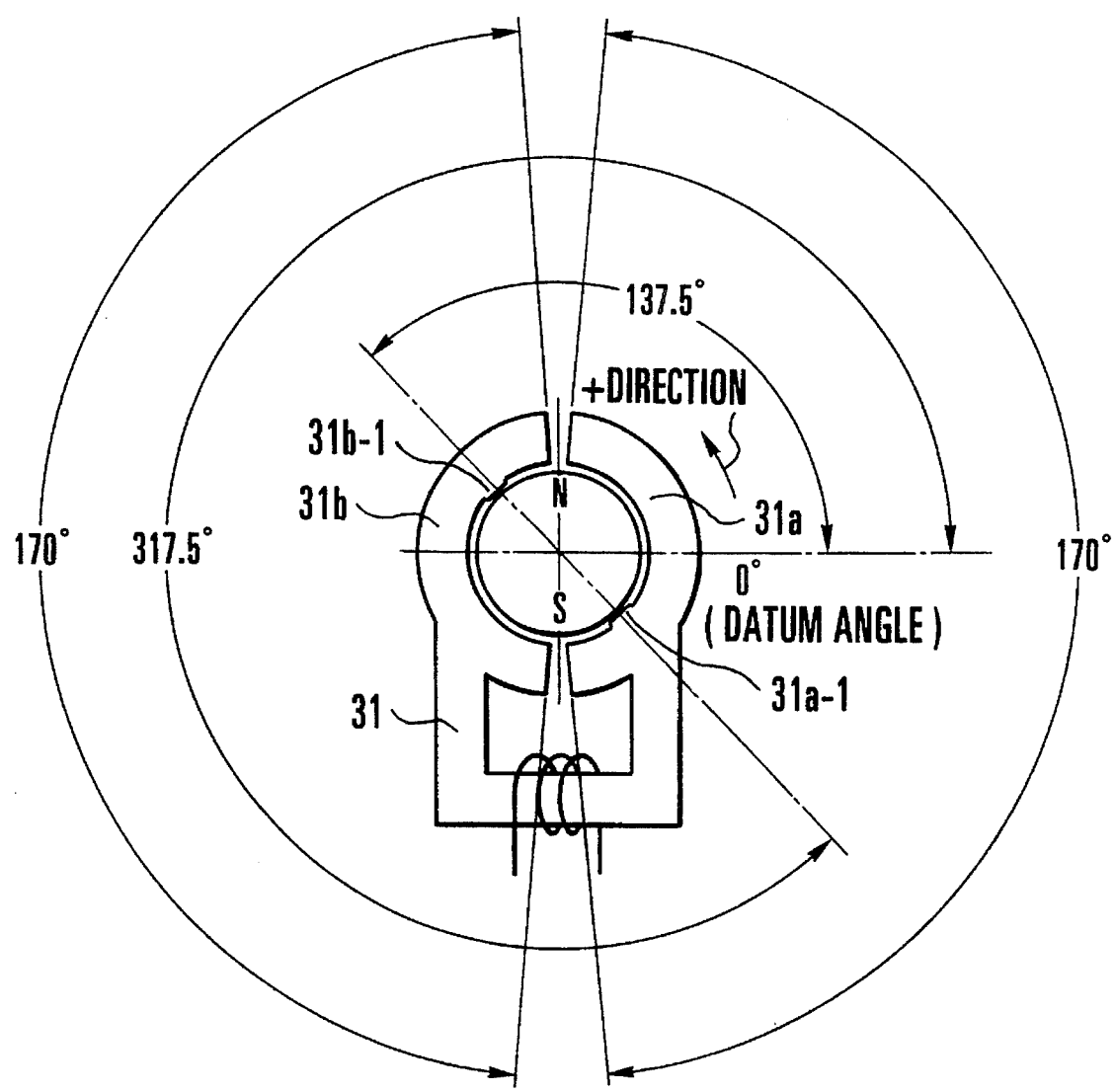
FIG. 15 schematically shows the magnetic circuit showing the feature of the third embodiment.

FIG. 14 shows a third embodiment of this invention which is arranged in the above-stated manner. In FIG. 14, reference numeral 31 denotes a stator yoke which is provided with the protruding parts, including a first protruding part 31a-1 and a second protruding part 31b-1. The positions of these protruding parts in the magnetic circuit which is schematically shown in FIG. 15 are as follows: Assuming that the opening angle of a first opposite part 31a of the stator yoke 31 is, for example, 170° and that of a second opposite part 31b also 170°, the first protruding part 31a-1 is, for example, located at 317.5° and the second protruding part 31b-1 at 137.5° with respect to a datum angle.

According to the above-stated arrangement, the protruding part which is much closer to the rotor than the other opposed part and a magnetic peak point of the rotor attract each other with a much stronger magnetic suction force than the other opposed part. Therefore, compared with a case where no protruding part is provided, the phase relation between the cogging torque and the torque generated by the coil is more effectively shifted to give the same torque characteristic as the one shown in FIG. 11. The arrangement of the third embodiment, therefore, gives an apposite drive source for a light quantity adjusting device. Further, with the protruding parts provided in predetermined positions, the air gap between the rotor and the stator yoke is never enlarged in part by the provision of grooves in the stator yoke like in the case of the first embodiment. Therefore, the effect of a magnetic field generated by the coil can be effectively transmitted to the rotor to bring about a strong torque. The arrangement of the third embodiment thus contributes to reduction in size of the light quantity adjusting device.

(Fourth Embodiment)

In the case of the first embodiment described in the foregoing, the base plate is provided for fixing the magnetic circuit of the driving part in place. However, this arrangement may be changed to use a lens tube for this purpose instead of using the base plate.

Figure 16:
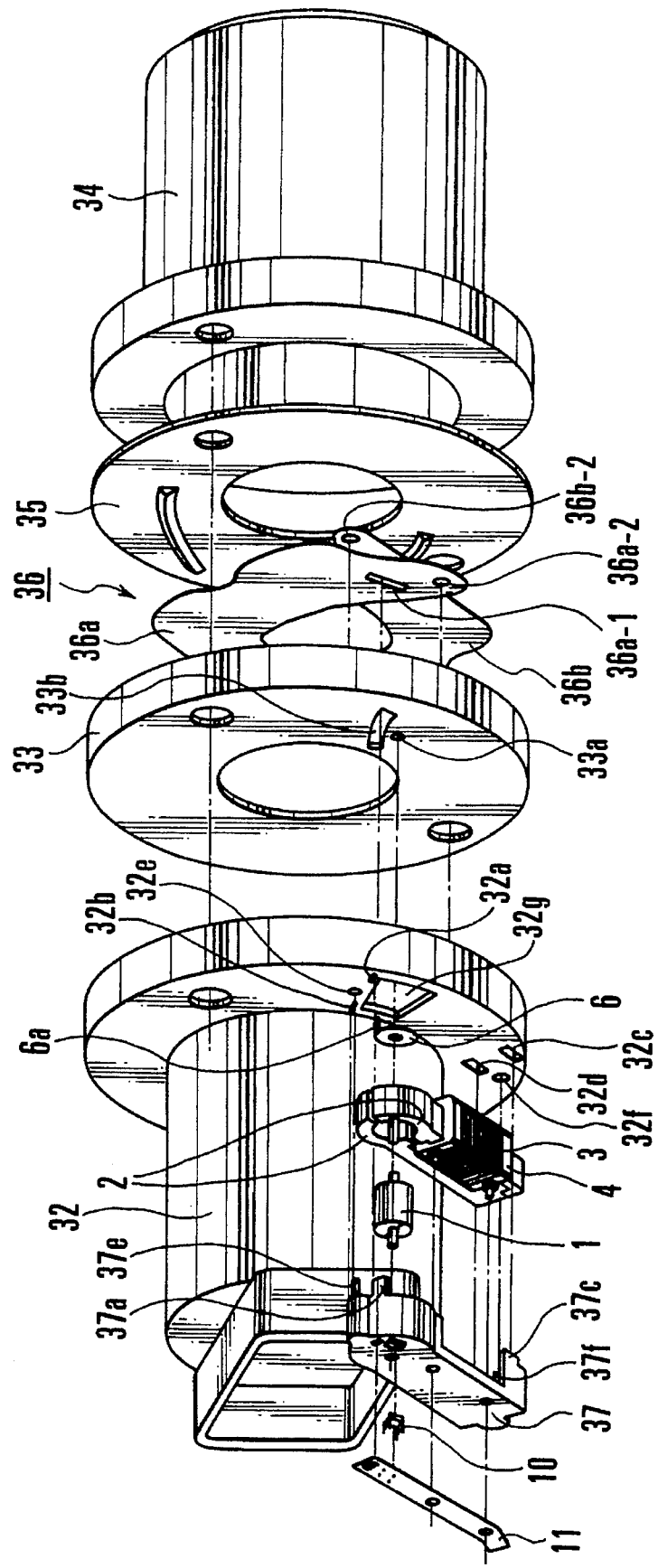
FIG. 16 is an oblique view showing a lens barrel which shows a feature of a fourth embodiment of this invention.

FIG. 16 shows the feature of a fourth embodiment of this invention wherein the arrangement of the first embodiment is changed in the above-stated manner. In FIG. 16, the illustration includes an A lens tube 32, a B lens tube 33, a C lens tube 34, a lid 35, a diaphragm blade group 36, a magnetic circuit (1 to 4) representing a feature of this invention, an arm 6, a cap 37, a magnetism detecting element 10 and a flexible circuit board 11.

Referring to FIG. 16, the A, B and C lens tubes 32, 33 and 34 are formed, for example, by molding and machining a plastic material. Of these lens tubes, the A lens tube 32 is provided with engaging holes 32a to 32d for fixing the cap 37, holes 32e and 32f for positioning the cap 37 and a window 32g for allowing the rotation shaft part of the rotor 1 and the arm 6 to be inserted through it. The B lens tube 33 is provided with a bearing 33a for carrying the rotation shaft of the rotor 1 and a window 33b which allows a protruding piece 6a of the arm 6 to be inserted through it and which serves also as a stopper.

The cap 37 is obtained, for example, by molding and machining a plastic material and is provided with pinching pieces 37a to 37d which have locking claws for securing the cap 37 to the A lens tube 32 and protruding pieces 37e and 37f for positioning the cap 37. Further, means for positioning a stator yoke 2 like the base plate of the first embodiment is provided on the inner side of the cap 37. All the parts that are the same as the parts of the first embodiment are omitted from description.

The magnetic circuit (1 to 4), the arm 6, the cap 37 on which the magnetism detecting element 10 and the flexible circuit board 11 are mounted and the A lens tube 32 are arranged such that the protruding pieces 37e and 37f and the pinching pieces 37a to 37d which are provided on the cap 37 engage the engaging holes 32a to 32d and the inserting (or positioning) holes 32e and 32f which are formed in the A lens tube 32.

One tip of the rotation shaft of the rotor 1 and the arm 6 are inserted into the inserting window 32g of the A lens tube 32. The tip of the rotation shaft of the rotor is fitted into the bearing 33a of the B lens tube 33. The protruding piece 6a of the arm 6 is inserted into moving slots 36a-1 and 36b-1 of the diaphragm blade group 36 through the moving window 33b formed in the B lens tube 33. The diaphragm blade group 36 is further provided with turning holes 36a-2 and 36b-2, which are arranged to allow the diaphragm blade group 36 to be carried by protruding pieces provided on the B lens tube 33. These protruding pieces are not shown but are similar to the protruding pieces 38a and 38b shown in FIG. 17. The A lens tube 32, the B lens tube 33, the C lens tube 34 and the lid 35 are fixed by means of screws or by some other known method.

The arrangement described above dispenses with the base plate which is used for the light quantity adjusting device arranged as the first embodiment. The arrangement of the fourth embodiment thus permits reduction in size and weight of the lens unit and contributes to the improvement in workability more than the arrangement of the first embodiment.

(Fifth Embodiment)

Figure 19:
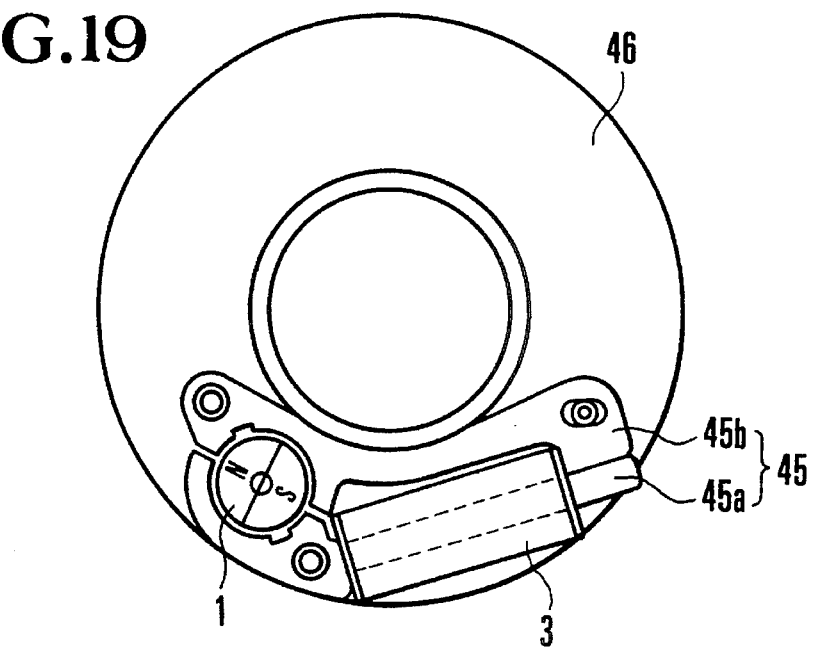
FIG. 19 is a plan view showing a fifth embodiment of this invention.

The following describes a fifth embodiment of this invention: FIG. 19 best shows a feature of the magnetic circuit of a light quantity adjusting device of the fifth embodiment. The magnetic circuit is shown as viewed in the direction of an optical axis. In FIG. 19, the illustration includes a rotor 1, a stator yoke 45 which is in an approximately arcuate shape and is made of a soft magnetic material, a coil 3 and a base plate 46. The stator yoke 45 which is approximately in an arcuate shape is provided with grooves in its parts opposed to the rotor 1. These grooves are located, for example, in the same positions as in the case of the first embodiment. The fifth embodiment operates in the same manner as the first embodiment. Therefore, the operating principle of the fifth embodiment is omitted from description.

Figure 20:
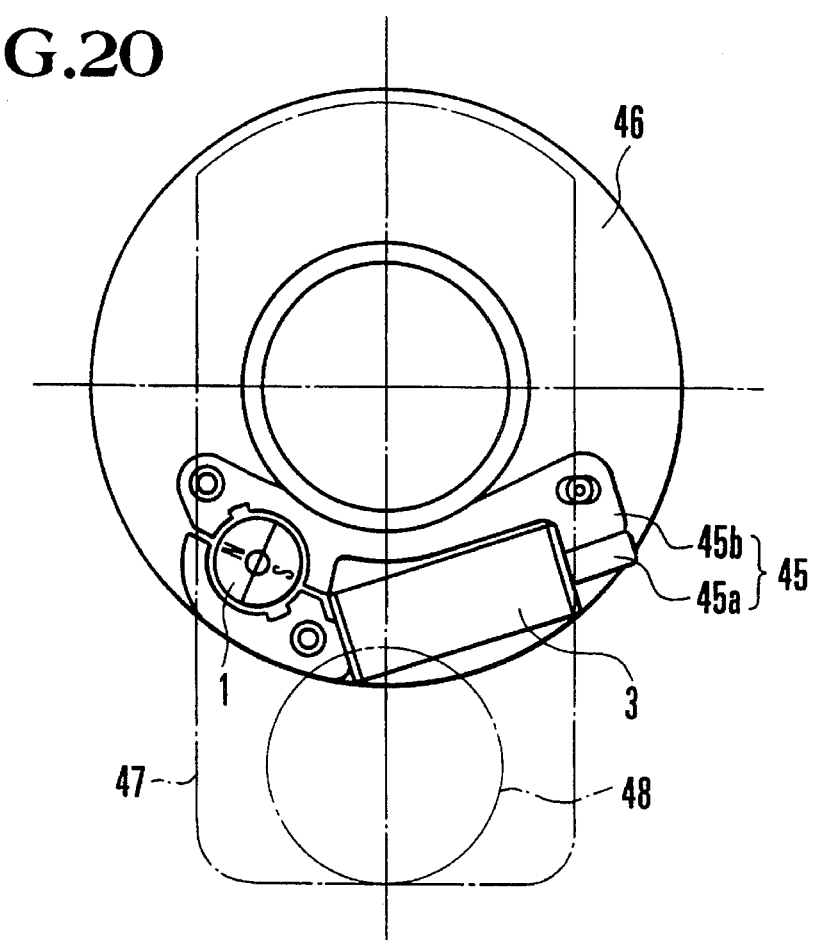
FIG. 20 is a plan view showing the shape of the fifth embodiment in comparison with that of the conventional device.

The inventor of this invention has conducted a study for reduction in size by comparing the shape of the light quantity adjusting device arranged according to this invention with that of the conventional light quantity adjusting device. FIG. 20 shows the comparison of their shapes as viewed from the direction of the optical axis. In FIG. 20, full lines show in outline the shape of the light quantity adjusting device embodying this invention. Reference numerals 47 and 48 denote the shape of the conventional light quantity adjusting device. Of these numerals, the numeral 48 shows the shape of the driving part of the conventional light quantity adjusting device. Compared with the conventional light quantity adjusting device, the light quantity adjusting device embodying this invention plainly has a much shorter length in the radial direction of it with respect to the optical axis.

FIG. 21 shows the comparison of their shapes as viewed from the radial direction. In FIG. 21, reference numeral 49 denotes the shape of the light quantity adjusting device embodying this invention and reference numeral 50 that of the conventional light quantity adjusting device. It is apparent from the illustration that the height in the direction of the optical axis of the light quantity adjusting device embodying this invention is much lower than that of the conventional light adjusting device.

As described above, the arrangement of forming the stator yoke approximately in an arcuate shape contributes to the reduction of the size of a light quantity adjusting device. Therefore, the light quantity adjusting device which is the fifth embodiment of this invention can be arranged to have a smaller outside diameter than the first embodiment of this invention described in the foregoing.

(Sixth Embodiment)

Figure 22:
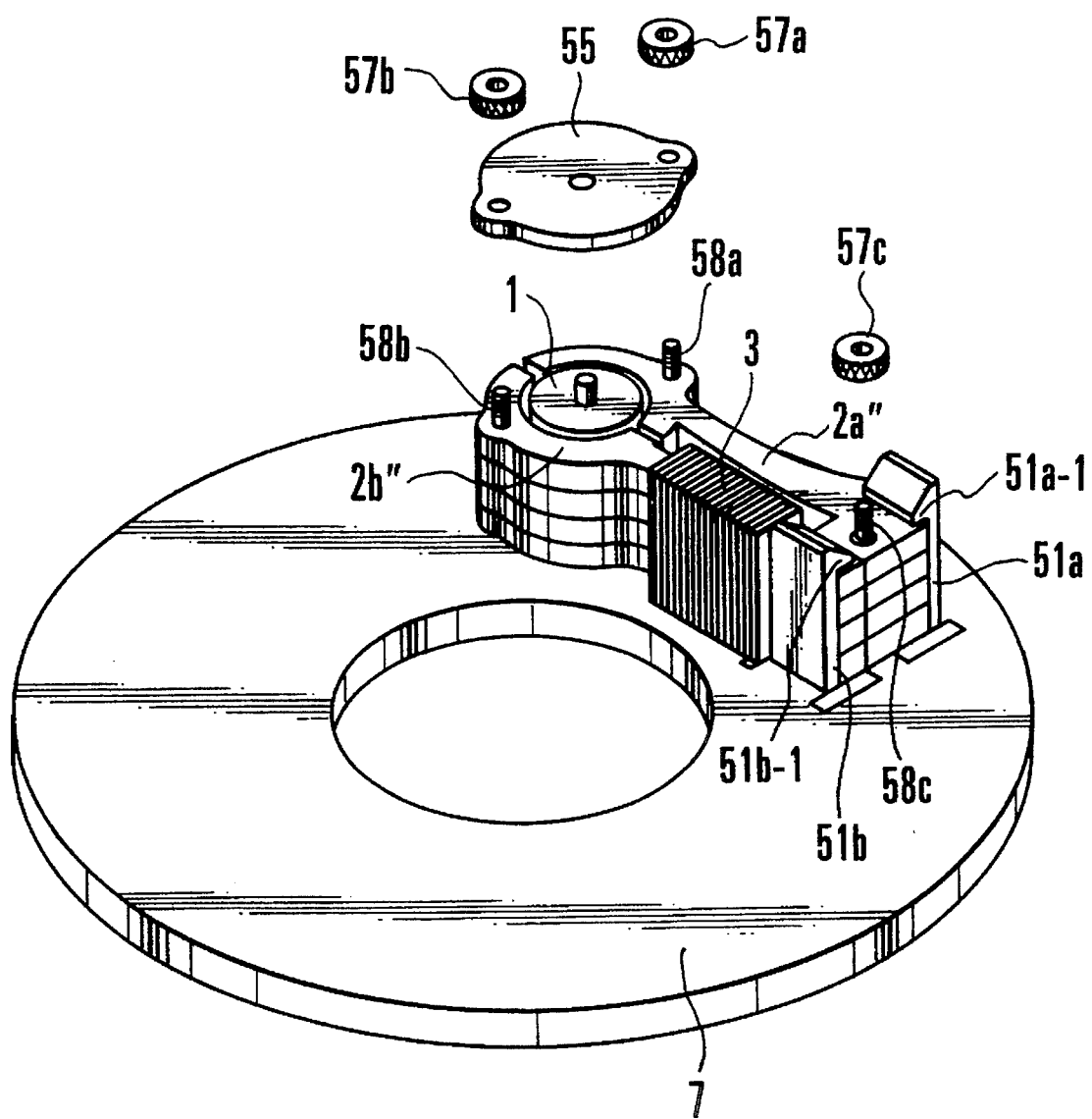
FIG. 22 is an oblique view showing a stator yoke of a sixth embodiment of this invention in a state of being joined.

FIG. 22 shows the arrangement of a stator yoke of a sixth embodiment of this invention as in a state of being joined. In FIG. 22, parts which are the same as or similar to the parts shown in FIG. 2 are indicated by the same reference numerals and the details of them are omitted from description.

Figure 3C:
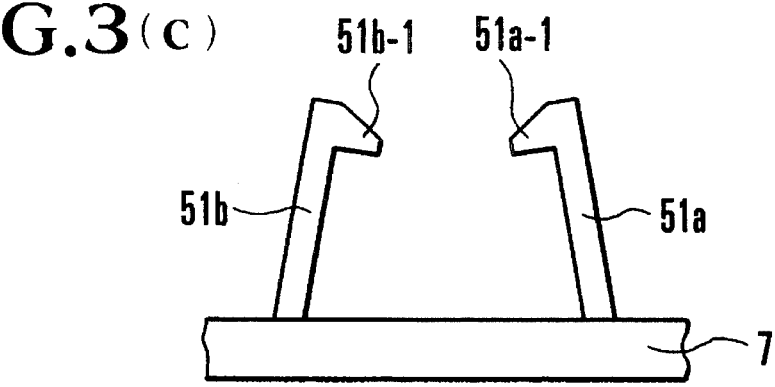
Figure 3D:
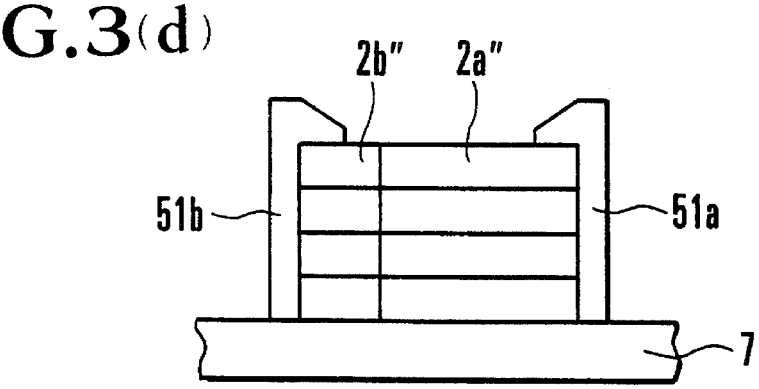

Referring to FIG. 22, protruding pieces 51a and 51b are provided respectively with locking claws 51a-1 and 51b-1. Before stator yoke pieces 2a" and 2b" are inserted in between them, the two protruding pieces 51a and 51b are a little slanting inward and toward each other as shown in FIG. 3(c). When the stator yoke pieces 2a" and 2b" are inserted, the protruding pieces 51a and 51b flex and open toward the outside. Upon completion of insertion, the protruding pieces 51a and 51b are relieved from the state of flexion and come into tight contact with the side faces of the stator yoke 2. Further, since the protruding pieces 51a and 51b are slanting inward before insertion, they exert their forces in such a way as to push the joining faces of the two stator yoke pieces 2a" and 2b" against each other after the stator yoke 2 is inserted. Therefore, the joined faces of the stator yoke 2 can be prevented from inadequately contacting each other to make the stator yoke 2 long serviceable and to enable it to resist impacts.

The fifth embodiment is thus arranged to increase the performance of the light quantity adjusting device and to contribute to uniformalization of quality of products. Further, unlike in the case of the first embodiment, the locking claws 51a-1 and 51b-1 are arranged to effectively prevent the stator yoke 2 from dropping out.

(Seventh Embodiment)

Figure 23:
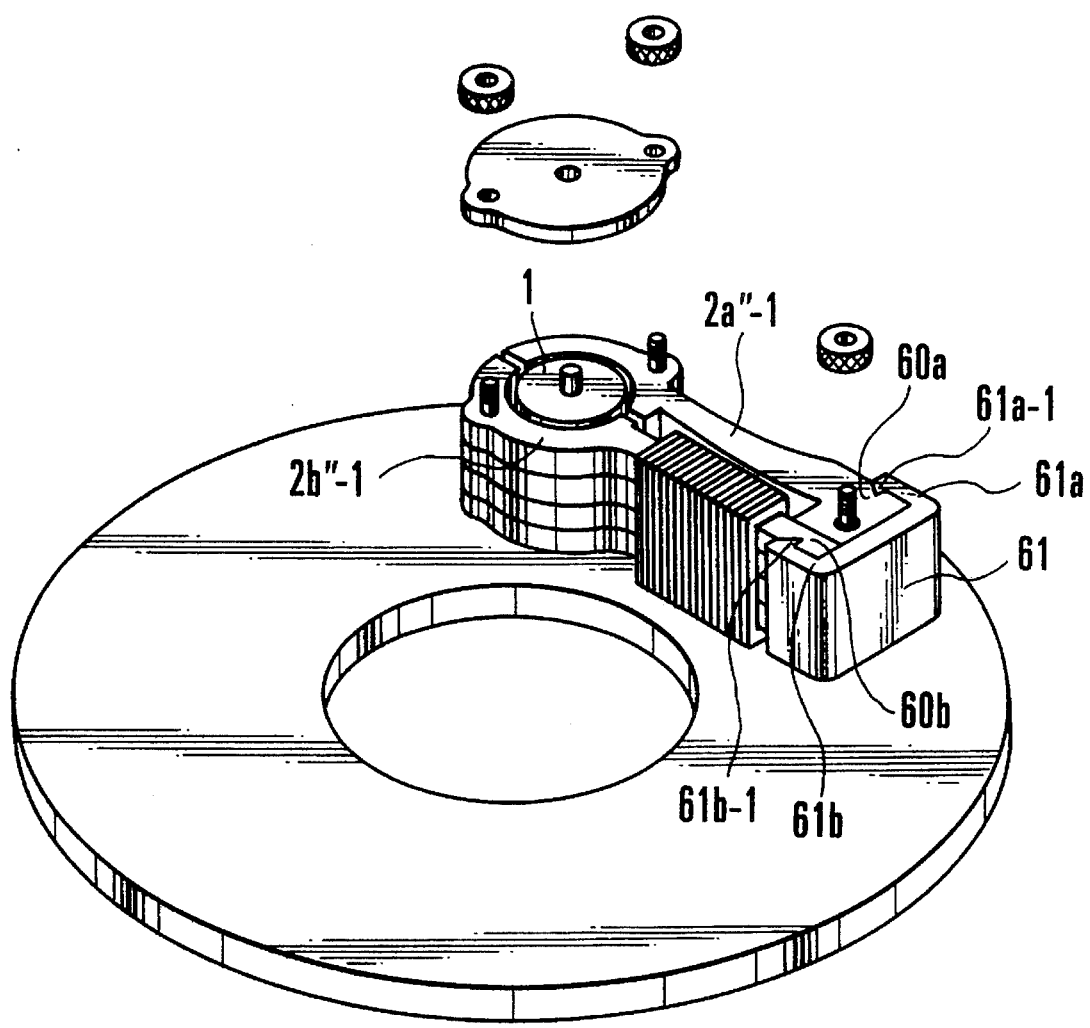
FIG. 23 is an oblique view showing a stator yoke of a seventh embodiment of this invention in a state of being joined.
Figure 24A:
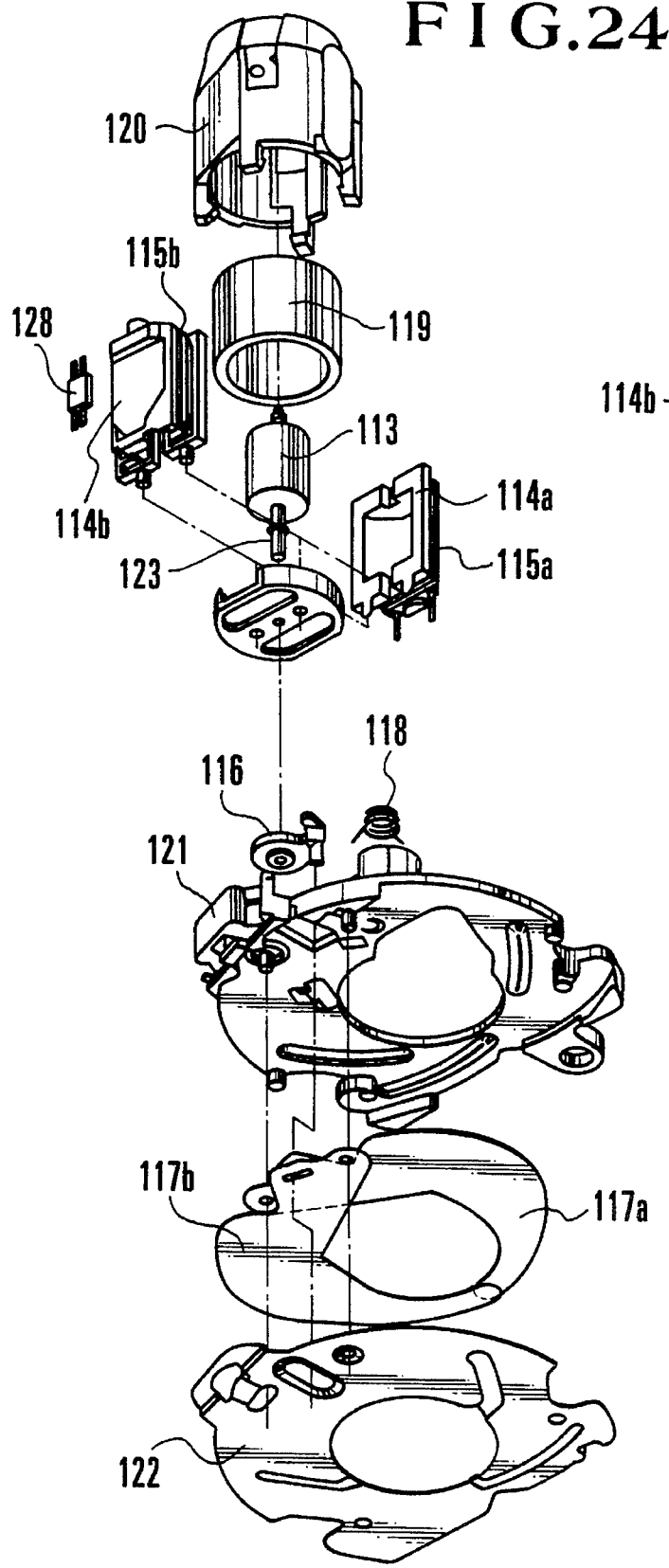
FIGS. 24(a) and 24(b) are oblique views showing the conventional light quantity adjusting device.
Figure 24B:
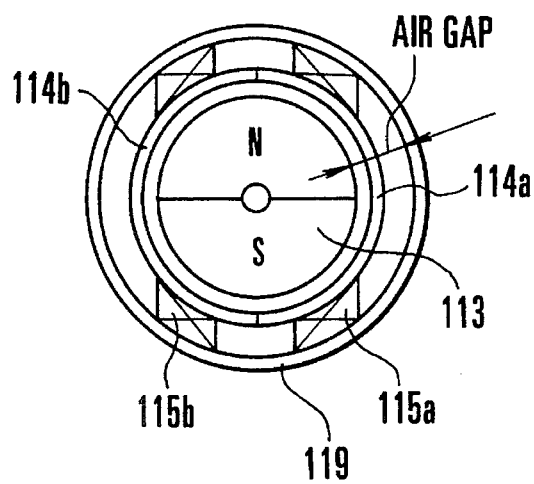

FIG. 23 is an oblique view showing a stator yoke of a seventh embodiment of this invention in a state of being joined. In joining stator yoke pieces together, an angular member 61 of a C shape may be used as shown in FIG. 23. The C shaped angular member 61 has locking claws 61a-1 and 61b-1. The stator yoke pieces 2a"-1 and 2b"-1 are provided with locking claw engaging grooves 60a and 60b for engaging each other. Like the sixth embodiment, the protruding pieces 61a and 61b of the angular member 61 which serve as pinching pieces are arranged to be slanting inward and toward each other before insertion of the stator yoke in between them. After insertion, the protruding pieces 61a and 61b exert their resilient forces to push the joining faces of the stator yoke pieces 2a'-1 and 2b"-1 against each other in such a way as to fix the stator yoke. This arrangement thus gives the same advantage as that of the sixth embodiment. Further, the use of the angular member 61 for this purpose separately from the base plate effectively prevents the base plate from such a damage as having locking claws broken.

In each of the first to seventh embodiments described above, a magnetic circuit is arranged to have the outer circumferential part of the magnet rotor which is magnetized to have two poles covered with the stator yoke which is made of a soft magnetic material and to have the coil wound around the stator yoke. The use of the magnetic circuit which is arranged in this manner for the light quantity adjusting device effectively contributes to reduction in size of the light quantity adjusting device.

Further, the magnetic circuit which is arranged in the above-stated manner is provided with the means for shifting the phase relation between the cogging torque and the torque generated by the coil. The provision of the phase relation shifting means dispenses with a return spring, so that the difficulty of assembly work due to the return spring can be avoided. The workability of the device thus can be enhanced. Besides, the performance of the device can be prevented from deteriorating due to the mechanical friction caused by the return spring at the time of sliding movement. Therefore, the invented arrangement contributes also to the uniformalization in quality of products.

In the magnetic circuit arranged as described above, the stator yoke is provided with protruding and recessed parts in its joined part, and a base plate to which the stator yoke is secured is arranged to have some protruding pieces which either have elasticity or locking claws and serve as pinching pieces. The provision of these pars stabilizes the performance of the magnetic circuit and contributes to the uniformalization in quality of the light quantity adjusting devices.

Further, the cap of the light quantity adjusting device according to this invention is provided with holes for inserting the magnetism detecting element and the coil terminals. These holes permit gathering all wiring lines together on the upper surface of the cap, so that the flexible circuit board can be simplified and the workability of the device can be enhanced.

The arrangement of forming the stator yoke approximately in an arcuate shape extending along a light flux passing area around the optical axis permits reduction in size of the device.

(Eighth Embodiment)

Figure 25:
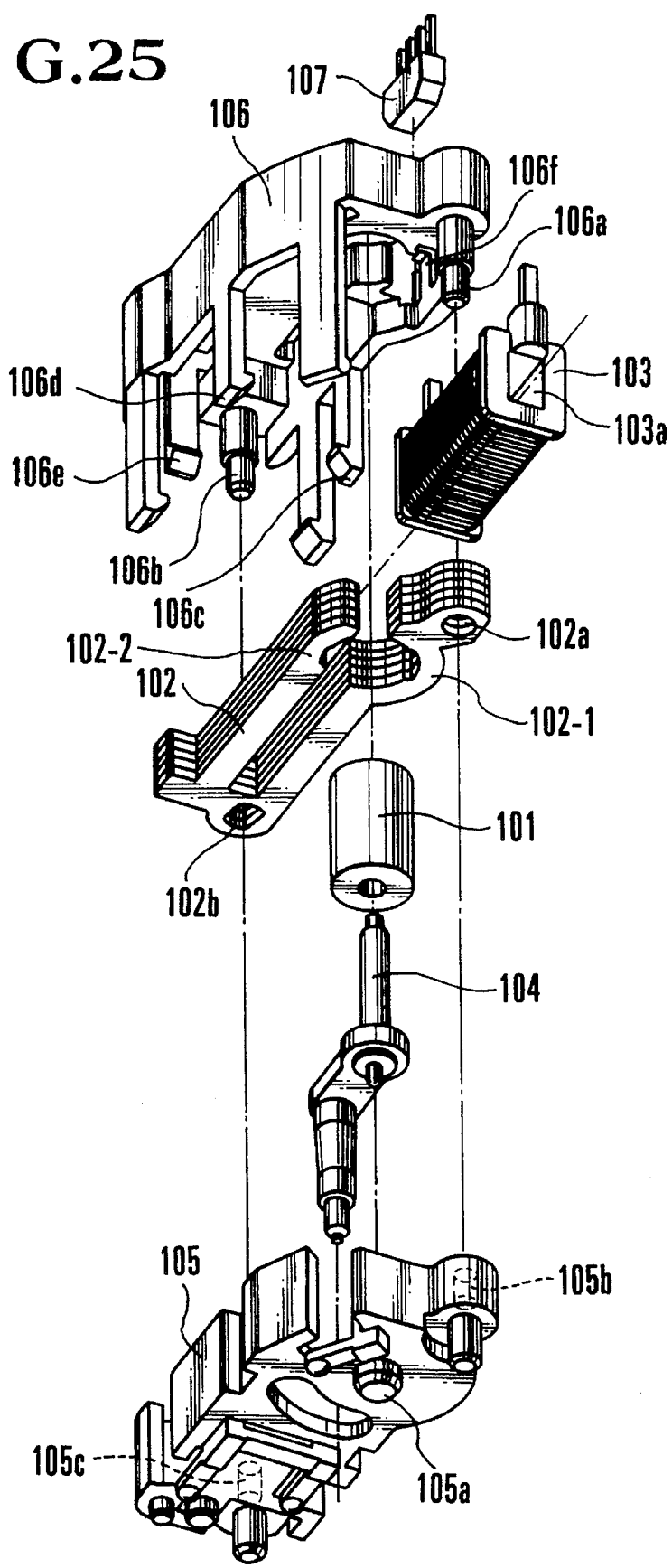
FIG. 25 is an exploded oblique view showing the essential parts of a light quantity adjusting device which is arranged as an eighth embodiment of this invention.

Next, a light quantity adjusting device which is arranged as an eighth embodiment of this invention is described as follows: Referring to FIG. 25, a rotor 101 is magnetized to have two poles and is magnetized mainly perpendicular to a rotor shaft. A stator 102 is made of a magnetic material such as a silicon steel plate and is composed of two stator pieces 102-1 and 102-2. The pole position of one stator piece 102-1 is shifted toward the optical axis of a lens barrel (see FIG. 1). Therefore, the rotor 101 can be set in a position which is virtually shifted toward the optical axis to permit reduction in size. The stator 102 is provided with positioning holes 102a and 102b. A bobbin 103 which is formed by molding a resin material is provided with a hole 103a for inserting the stator 102 and has a conducting wire wound around it on the outer side of the hole 103a. An arm 104 is formed by molding a resin material and serves also as the shaft of the rotor 101. A cap 105 is formed by molding a resin material. The cap 105 is provided with a bearing 105a and engaging holes 105b and 105c for engaging a case 106. The case 106 is formed by molding a resin material and is provided with a pinching part 106e for pinching the stator 102, protruding parts 106a and 106b for positioning the stator 102 and the cap 105, pinching parts 106c and 106d for pinching the cap 105, a pinching part 106f for pinching a magnetism detecting element 107 and a bearing part 106g (shown in FIG. 26(a)) for receiving the shaft part of the arm 104.

The rotor 101 is connected to the rotor shaft part of the arm 104. The bobbin 103 is mounted on the stator 102 by inserting the stator piece 102-2 into the hole 103a of the bobbin 103. With the bobbin 103 thus mounted, the stator 102 has its holes 102a and 102b fittingly engage the protruding parts 106a and 106b which are provided on the case 106. Further, the stator 102 is secured to the case 106 by means of the pinching part 106e provided on the case 106. The cap 105 is fixedly carried by the case 106, with the protruding parts 106a and 106b of the case 106 fitted into the holes 105b and 105c of the cap 105 and with the pinching parts 106c and 106d of the case 106 allowed to engage the cap 105 while causing the shaft part of the arm 104 on which the rotor 101 is mounted to engage the bearing part 106g of the case 106 and the bearing part 105a of the cap 105. The magnetism detecting element 107 is secured to the case 106 by engaging the pinching part 106f provided on the case 106.

Figure 26A:
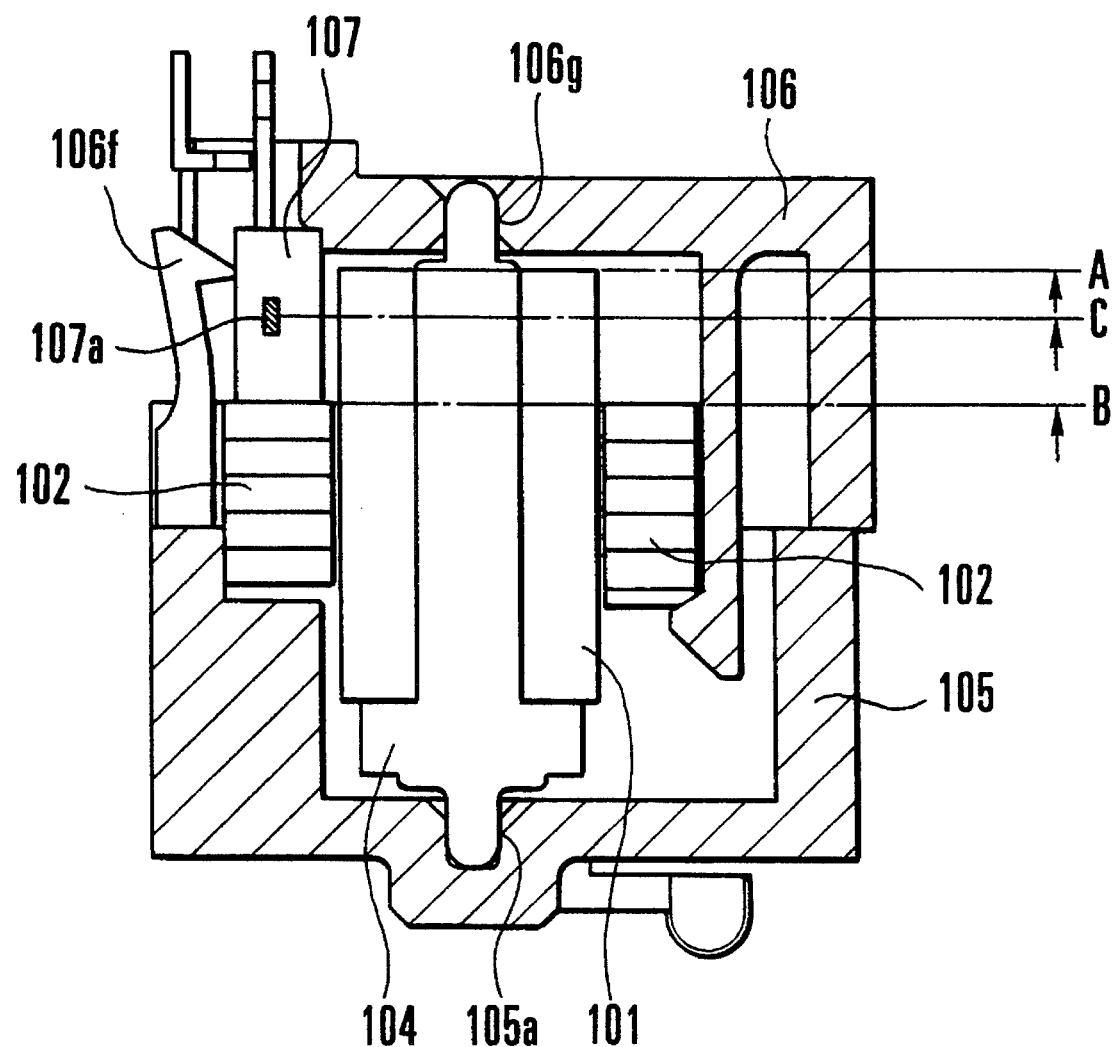
FIGS. 26(a), 26(b) and 26(c) are sectional views showing the arrangement of the light quantity adjusting device of FIG. 25 around a rotor thereof.

FIG. 26(a) is a sectional view of the light quantity adjusting device of FIG. 25, showing its parts around the rotor 101 to show the positional relation among the rotor 101, the stator 102 and the magnetism sensing face 107a of the magnetic detecting element 107. In FIG. 26(a), a line A indicates the position of the end face of the rotor 101, a line B the end face of the stator 102 and a line C the position of the magnetism sensing face 107a of the magnetism detecting element 107. A relation in height among these lines are expressed as follows:

A>C>B

Figure 26B:
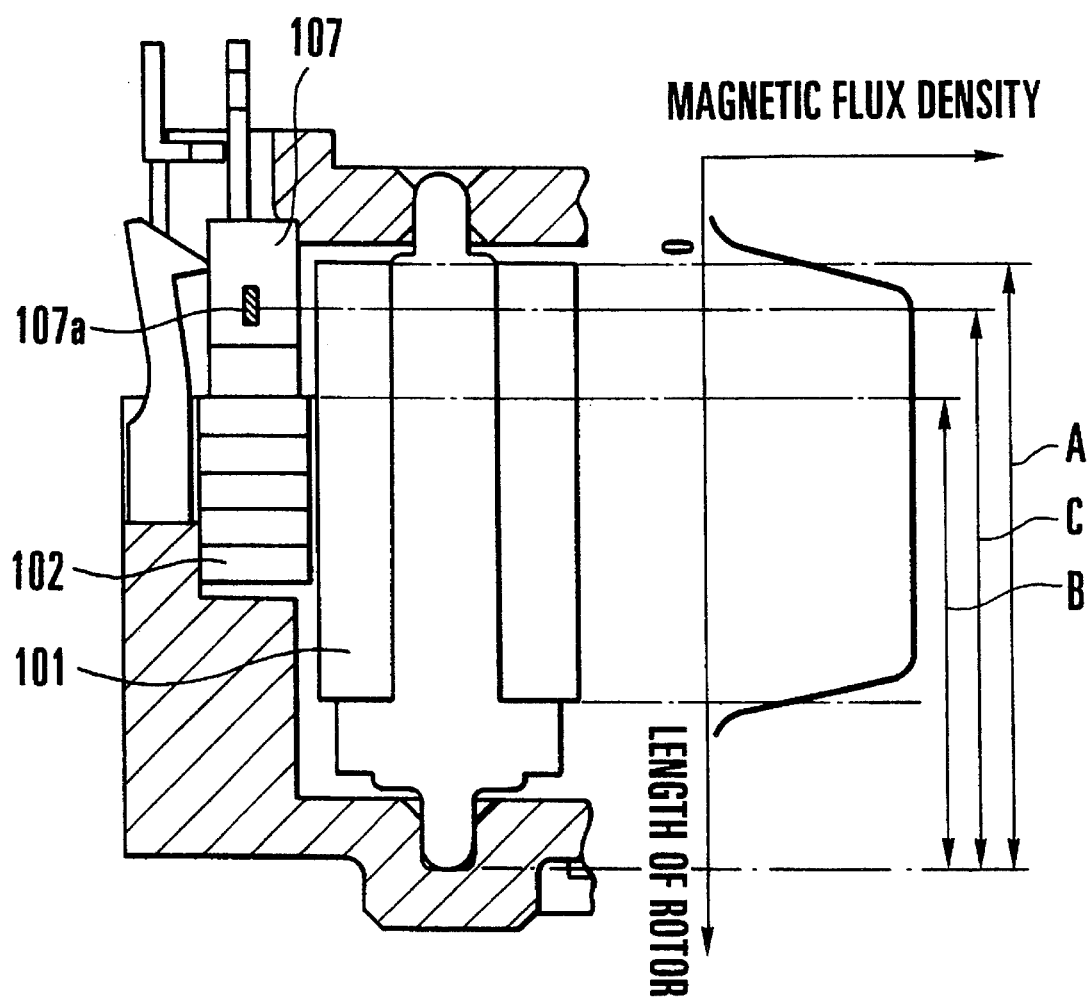

FIG. 26(b) is a sectional view showing the rotor 101 and parts located around the rotor 101 with a relation between the position of the rotor 101 and the density of a magnetic flux passing through the magnetism sensing face 107a added to the illustration. It is apparent from FIG. 26(b) that the magnetic flux density saliently varies in the neighborhood of the end face A of the rotor 101 and becomes almost zero when the position C of the magnetism sensing face 107a exceeds the height of the end face A of the rotor 101. Under such a condition, almost no output is obtainable from the magnetism detecting element 107 and damping becomes impossible. Even if the output is obtained in a small amount, it is necessary to extremely increase an amplification factor, and deterioration in S/N ratio tends to cause inadequate damping. In the neighborhood of the end face B of the stator 102, on the other hand, the density of the magnetic flux reaches a peak and remains stable without being caused to vary by the position of the rotor 101. In other words, the output of the magnetism detecting element 107 is sufficiently obtainable even if the position of the rotor 101 is caused to slightly vary in the direction of thrust by vibrations transmitted from outside. Therefore, the position C of the magnetism sensing face 107a of the magnetism detecting element 107 is preferably at least between the end face position A of the rotor 101 and the end face position B of the stator 102.

Figure 26C:
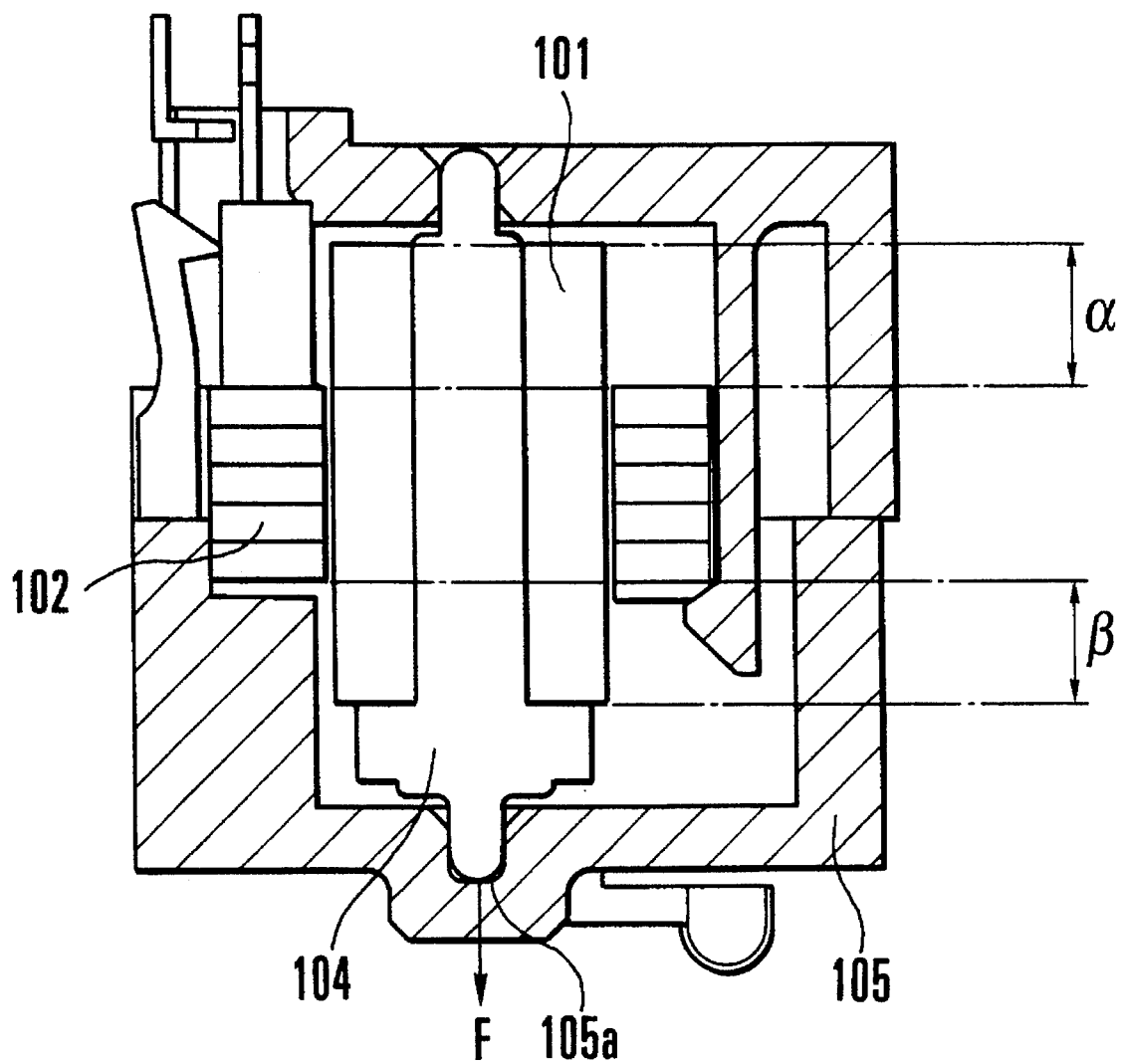

FIG. 26(c) shows the amount of protrusion of the rotor 101 from the end face of the stator 102. In FIG. 26(c), reference symbol α denotes the amount of upward protrusion of the rotor 101 from the end face of the stator 102. Reference symbol β denotes the amount of downward protrusion of the rotor 101 from the end face of the stator 102. In the case of FIG. 26(c), the amounts α and β are in the following relation:

α>β

This relation causes the rotor 101 to become magnetically unbalanced, and a magnetic suction acts to bring about a state of α=β. Then, with the bearing 105a arranged, as shown in FIG. 26(c), to maintain the relation of α>β, the bearing 105a is constantly receiving a downward urging force. In other words, by arranging the bearing to maintain the above-stated relation, the arm 104 on which the rotor 101 is mounted can be constantly urged downward. By virtue of this, the rotor 101 can be prevented from being caused to rattle in the direction of thrust by vibrations or the like coming from outside. Therefore, the magnetic flux passing through the magnetism detecting element 107 becomes stable to stabilize the output of the magnetism detecting element 107, so that damping can be adequately accomplished.

In the case of the eighth embodiment, as described above, the magnetism sensing face of the magnetism detecting element is disposed near to the side face of the rotor and between the end face of the stator and that of the rotor. In addition to that, the rotor bearing is arranged to cause the upward protruding amount and the downward protruding amount of the rotor which protrudes from the end face of the stator to be unequal to each other. This arrangement enables the embodiment to stably obtain the output of the magnetism detecting element in a sufficient amount and thus to have adequate damping, so that the performance of the light quantity adjusting device can be greatly enhanced.

Further, with the rotor bearing arranged to cause the upward and downward protruding amounts of the rotor which protrudes from the end face of the stator to be unequal to each other, the rotor shaft can be urged in the axial direction of the rotor without recourse to any urging member, so that the size of the light quantity adjusting device can be reduced, particularly, in the axial direction of the rotor.

What is claimed is:

1. A light quantity adjusting device comprising:

a light blocking member arranged to move to adjust a quantity of light; and a drive source for driving said light blocking member, said drive source including at least a rotor having a plurality of poles, a stator, a coil and limiting means for limiting a rotation angle range, wherein a first torque generating irrespective of energization of said coil works over the whole rotation angle range to cause said rotor to rotate in one direction and a second torque generated when said coil is energized works over the whole rotation angle range to cause said rotor to rotate in the other direction, the peak of the second torque being set to be obtainable within the rotation angle range, and a torque which is obtained by combining the first torque and the second torque working to cause said rotor to rotate in the other direction.

2. A device according to claim 1, wherein stator poles of said stator are set in such a way as to cause the phase of the first torque and that of the second torque to deviate from each other.

3. A device according to claim 1, wherein the rotation of an output shaft of said rotor is transmitted to a driving member, and wherein said light blocking member is caused to move by the rotation of said driving member.

4. A device according to claim 2, wherein cutout parts are formed at said stator poles.

5. A device according to claim 2, wherein protruding parts are formed at said stator poles.

6. A device according to claim 2, wherein interpoles are formed at said stator poles.

7. A device according to claim 1, wherein the torque obtained by combining the first torque and the second torque becomes nearly flat within the rotation angle range.

8. A device according to claim 1, wherein said stator is arranged to serve also as a yoke, said coil is wound around said stator, said stator is divided at least into two stator members, and said stator members are joined together by recessed and protruding joining parts.

9. A device according to claim 1, wherein said stator is arranged to serve also as a yoke, said coil is wound around said stator, said stator is divided at least into two stator members, and said stator members are joined together by being pinched by pinching members which have elasticity.

10. A device according to claim 1, wherein said stator is arranged to serve also as a yoke, said coil is wound around said stator, and said stator is formed approximately in an arcuate shape around an optical axis.

11. An optical apparatus having a light quantity adjusting device, comprising:

a light blocking member arranged to move to adjust a quantity of light, said light blocking member being movably supported by a support member which has a hole formed therein for passing a light flux;

a lens barrel member; and a drive source for driving said light blocking member, said drive source including at least a rotor having a plurality of poles, a stator, a coil and limiting means for limiting a rotation angle range, wherein a first torque generating irrespective of energization of said coil works over the whole rotation angle range to cause said rotor to rotate in one direction and a second torque generated when said coil is energized works over the whole rotation angle range to cause said rotor to rotate in the other direction, the peak of the second torque being set to be obtainable within the rotation angle range, and a torque which is obtained by combining the first torque and the second torque working to cause said rotor to rotate in the other direction.

12. An apparatus according to claim 11, wherein said rotor is disposed in a position which is eccentric in the direction of an optical axis of said lens barrel member.

13. An apparatus according to claim 11, wherein stator poles of said stator are set in such a way as to cause the phase of the first torque and that of the second torque to deviate from each other.

14. An apparatus according to claim 11, wherein the rotation of an output shaft of said rotor is transmitted to a driving member, and wherein said light blocking member is caused to move by the rotation of said driving member.

15. An apparatus according to claim 11, wherein cutout parts are formed at said stator poles.

16. An apparatus according to claim 11, wherein the torque obtained by combining the first torque and the second torque becomes nearly flat within the rotation angle range.

17. An apparatus according to claim 11, wherein said stator is arranged to serve also as a yoke, said coil is wound around said stator, said stator is divided at least into two stator members, and said stator members are joined together by being pinched by pinching members which have elasticity.

18. An apparatus according to claim 11, wherein said stator is arranged to serve also as a yoke, said coil is wound around said stator, and said stator is formed approximately in an arcuate shape around an optical axis.

19. An apparatus according to claim 11, wherein said stator is arranged to serve also as a yoke, said coil is wound around said stator, and said stator is mounted directly on said lens barrel member.

20. An apparatus according to claim 11, wherein said stator is arranged to serve also as a yoke, said coil is wound around said stator, said stator is supported by a second support member, and said second support member is mounted on said lens barrel member.

21. A driving device including at least a rotor having a plurality of poles, a stator, a coil and limiting means for limiting a rotation angle range, wherein a first torque generating irrespective of energization of said coil works over the whole rotation angle range to cause said rotor to rotate in one direction and a second torque generated when said coil is energized works over the whole rotation angle range to cause said rotor to rotate in the other direction, the peak of the second torque being set to be obtainable within the rotation angle range, and a torque which is obtained by combining the first torque and the second torque working to cause said rotor to rotate in the other direction.

22. A device according to claim 21, wherein stator poles of said stator are set in such a way as to cause the phase of the first torque and that of the second torque to deviate from each other.

23. A device according to claim 22, wherein cutout parts are formed at said stator poles.

24. A device according to claim 22, wherein protruding parts are formed at said stator poles.

25. A device according to claim 22, wherein interpoles are formed at said stator poles.

26. A device according to claim 21, wherein the torque obtained by combining the first torque and the second torque becomes nearly flat within the rotation angle range.

27. A device according to claim 21, wherein said stator is arranged to serve also as a yoke, said coil is wound around said stator, said stator is divided at least into two stator members, and said stator members are joined together by recessed and protruding joining parts.

28. A device according to claim 21, wherein said stator is arranged to serve also as a yoke, said coil is wound around said stator, said stator is divided at least into two stator members, and said stator members are joined together by being pinched by pinching members which have elasticity.

* * * * *